US006983173B2

(12) United States Patent
Miyatani

(10) Patent No.: US 6,983,173 B2
(45) Date of Patent: Jan. 3, 2006

(54) TELECOMMUNICATIONS DEVICE

(75) Inventor: Tetsuhiko Miyatani, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 518 days.

(21) Appl. No.: 10/180,506

(22) Filed: Jun. 27, 2002

(65) Prior Publication Data

US 2003/0017852 A1 Jan. 23, 2003

(30) Foreign Application Priority Data

Jul. 18, 2001 (JP) ............................ 2001-217816

(51) Int. Cl.
*H04M 1/00* (2006.01)

(52) U.S. Cl. .............................. 455/562.1; 455/193.1; 455/226.1; 455/522

(58) Field of Classification Search ............ 455/193.1, 455/226.1, 214, 266, 25, 522, 562, 101, 550, 455/129; 375/144, 130
See application file for complete search history.

(56) References Cited

U.S. PATENT DOCUMENTS 6,633,257 B2 * 10/2003 Ito ............................ 342/368
6,678,309 B1 * 1/2004 Kitahara .................... 375/144
2002/0028666 A1 * 3/2002 Nakagawa et al. ...... 455/193.1
2002/0028694 A1 * 3/2002 Doi ........................... 455/550
2004/0171385 A1 * 9/2004 Haustein et al. ............ 455/450

* cited by examiner

*Primary Examiner*—Sonny Trinh
*Assistant Examiner*—Phuoc Doan
(74) *Attorney, Agent, or Firm*—Wenderoth, Lind & Ponack, L.L.P.

(57) ABSTRACT

A telecommunications device is provided that enables monitoring of the directivity of a wireless communications system that wirelessly transmits signals using multiple communications antennas while controlling the overall directivity of the multiple antennas. At least one monitor antenna, installed separately from multiple communications antennas controlled to achieve a prescribed overall directivity, wirelessly receives signals from the multiple communications antennas. A directivity information acquisition mechanism uses the signals received by the monitor antenna to acquire information regarding the overall directivity of the multiple communications antennas. The directivity information acquired by the directivity information output mechanism is output to an external achieved directivity accuracy monitoring mechanism, and the achieved directivity accuracy monitoring mechanism monitors the accuracy of achieved overall directivity of the multiple communications antennas based on a difference between the directivity information and directivity information predicted to be acquired when a prescribed directivity is achieved.

20 Claims, 11 Drawing Sheets

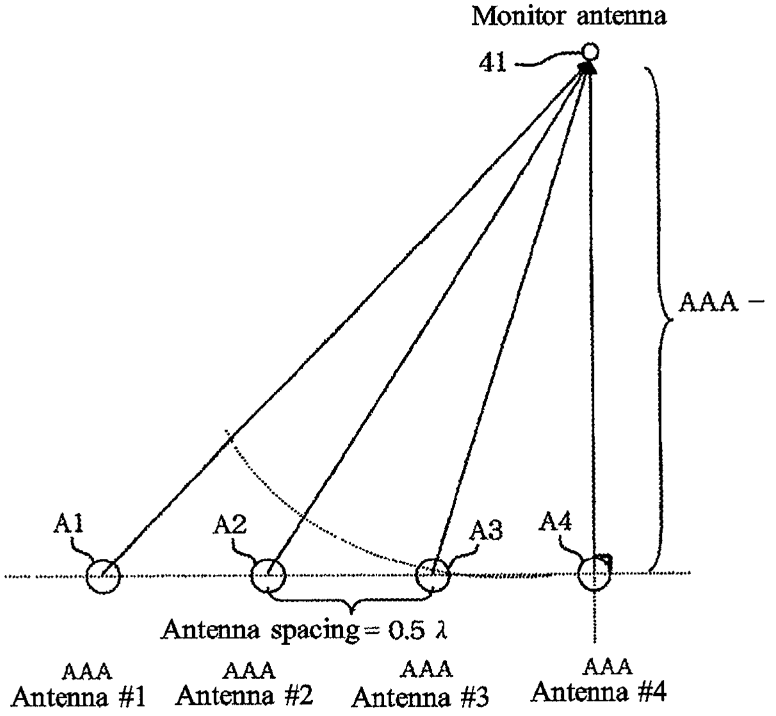

Phase shift owing to distance between monitor antenna and AAA antenna

AAA #4 - Monitor :

Distance : $n\lambda$

Phase shift: $2\pi \cdot \text{Distance}/\lambda = 2n\pi = \xi 4$

AAA #3 - Monitor :

Distance : $\sqrt{\left(\frac{1}{2}\right)^2 + n^2}\,\lambda$

Phase shift: $2\pi \cdot \text{Distance}/\lambda = 2\sqrt{\left(\frac{1}{2}\right)^2 + n^2}\,\pi = \xi 3$ AAA #2 - Monitor :

Distance : $\sqrt{1^2 + n^2}\,\lambda$

Phase shift: $2\pi \cdot \text{Distance}/\lambda = 2\sqrt{1^2 + n^2}\,\pi = \xi 2$ AAA #1 - Monitor :

Distance : $\sqrt{\left(\frac{3}{2}\right)^2 + n^2}\,\lambda$

Phase shift: $2\pi \cdot \text{Distance}/\lambda = 2\sqrt{\left(\frac{3}{2}\right)^2 + n^2}\,\pi = \xi 1$

Fig.7

At the time point signal reaches antenna #4 no signal has yet reached the other antennas, which causes phase shift. Vectorization of the phase shift gives the array response vector.

TELECOMMUNICATIONS DEVICE

BACKGROUND OF THE INVENTION

1. Field of the Invention

This invention relates to a telecommunications device, particularly to a transceiver or the like that conducts wireless telecommunications using an adaptive array antenna or the like, still more particularly to a function for monitoring the transmit directivity of an adaptive array antenna used in a transceiver or the like.

2. Description of the Prior Art

Code division multiple access (CDMA) wireless telecommunications systems utilizing the adaptive array antenna (AAA) have come under consideration in recent years.

The adaptive array antenna assigns different weights (antenna weights) to multiple antennas so that signal reception and transmission can be conducted while controlling the directivity of the antennas as a whole. During reception, for example, the adaptive array antenna is controlled to maximize directivity in the direction of the desired incoming wave and strongly depress received signal quality with respect to signals from other directions. This control operation is conducted using a control algorithm provided in the device.

FIG. 9 shows the configuration of an AAA-equipped CDMA base station. As shown the CDMA base station incorporates an adaptive array antenna composed of four transmit-receive antennas A11–A14 (antenna #1–antenna #4), four transmit-receive wireless units W11–W14 each associated with one of the transmit-receive antennas A11–A14, and a common user-segregated AAA signal processor D2 for the four transmit-receive antennas A11–A14 and four transmit-receive wireless units W11–W14.

In the illustrated example, the total number N (N being a natural number) of antennas constituting the adaptive array antenna is four, and four transmit-receive antenna chains are constituted by the transmit-receive antennas A11–A14 and the four transmit-receive wireless units W11–W14.

An example of the operation of the illustrated CDMA base station will be explained.

The transmit-receive antennas A11–A14 of the CDMA base station receive signals wirelessly transmitted by one or more mobile stations and each outputs the received signals to the associated one of the transmit-receive wireless units W11–W14. The transmit-receive wireless units W11–W14 incorporate a function of converting (down-converting) the received signals coming in via the transmit-receive antennas A11–A14 from the radio frequency (RF) band to an intermediate frequency (IF) band or a base band (BB). The incoming signals are down-converted by this function and output to the user-segregated AAA signal processor D2.

The user-segregated AAA signal processor D2 CDMA-despreads the received signals coming in from the transmit-receive wireless units W11–W14 by user (e.g., by mobile station). Then, in order to implement the AAA function, it multiplies the despreading result for each transmit-receive antenna A11–A14 and each user by the receive antenna weights of the transmit-receive antennas A11–A14, synthesizes the multiplication results for all transmit-receive antennas A11–A14 by user and uses the results as the AAA receive signals for the individual users.

When receive antenna weights are determined by individual receive antennas using a given algorithm, the received signals from the receive antennas are multiplied by the receive antenna weights and the results are synthesized, an improvement in received signal quality can generally be obtained thanks to the receive directivity of the adaptive array antenna. By carrying out the same process in reverse, an improvement in transmitted signal quality can be achieved.

In a CDMA base station, for example, a common transmit signal for all transmit-receive antennas A11–A14 is prepared for each user (e.g., each mobile station), the user-segregated AAA signal processor D2 then generates for each user a different transmit antenna weight for every transmit-receive antenna A11–A14, multiplies each user's transmit signal by the transmit antenna weights of the individual transmit-receive antennas A11–A14, synthesizes the multiplication results for all transmit-receive antennas A11–A14, and defines the by-user results for all users as the AAA transmit signals of the transmit-receive antennas A11–A14. The transmission directivity of the adaptive array antenna attributable to the different transmitting power of the signals transmitted from the different transmit-receive antennas A11–A14 improves the reception quality from the viewpoint of the receiving parties (e.g., mobile stations).

Any of various algorithms can be used to generate the receive antenna weights and transmit antenna weights.

FIG. 9 shows a case where user data for X (X being a natural number) users are processed for reception or processed for transmission.

FIG. 10 shows an example of calculated antenna receive directivity patterns in an adaptive array antenna. The pattern designated (a) is an example in which the maximum directivity has been adjusted to 0 degrees for reception of an incoming wave from the 0-degree direction, and the pattern designated (b) is an example in which the maximum directivity has been adjusted to 45 degrees for reception of an incoming wave from the 45-degree direction. For reference, the drawing also shows the directivity component in the 180-direction that is the opposite direction from 0 degree, and the −45-degree direction that is the opposite direction from 45 degrees.

When received signals are processed with directivity controlled by such an adaptive array antenna, received signal processing can be conducted while eliminating interference entering the antenna owing to waves arriving from directions different from the arrival direction of the desired signal. The adaptive array antenna has therefore drawn considerable attention as a technology for eliminating interference.

The foregoing explanation regarding directivity during reception also applies to the directivity and interference removal effect during transmission, except that special measurement is required.

The special measurement required for an adaptive array antenna during transmission will now be explained.

This special measurement is called "calibration." Calibration is for correcting error (deviation) in phase and amplitude that arises in transmission and reception chains including transmit-receive antennas and in the individual devices making up the chains owing to variation occurring during manufacture.

This will be explained with reference to a specific problem. Assume, for example, that based on a phase calculated from receiver output varying in phase and amplitude (gain), a mobile station is detected in the direction of 45 degrees as viewed from a base station. At transmission, the directivity of the adaptive array antenna should be adjusted to be maximum in the direction of 45 degrees. If the transmitter section has not been calibrated, however, it is actually impossible to impart high antenna directivity in the 45-degree direction because phase differences and level differences (amplitude differences) are present in the individual antenna chains. If the receiver section has not been calibrated, moreover, the detection of the mobile station in the 45-degree direction cannot be relied on from the start. The end result is that unless calibration is conducted the transmit directivity will be adjusted to a direction different from that where the mobile station is located.

FIG. 11 shows an example of the directivity patterns (e.g., transmit directivity pattern) achieved with an adaptive array antenna. Curve (a) represents a directivity pattern with calibration and curve (b) represents a directivity pattern without calibration. The horizontal axis of the graph is scaled for direction angle (degree) as viewed from the adaptive array antenna, and the vertical axis is scaled for the level [dB] of the transmitted/received signal. As the graph shows, when the communication antenna chains have been accurately calibrated, maximum directivity can be achieved in the direction of the angle V1 in which the mobile station is present (user direction), but when the communication antenna chains have not been accurately calibrated, the direction angle shifts owing to the calibration error, so that the direction angle of the maximum directivity becomes a different direction angle V2.

The communication antenna system calibration can, for instance, be receive calibration for correcting phase and amplitude deviation among transmit-receive antenna chains when receiving signals using the transmit-receive antenna chains, transmit calibration for correcting phase and amplitude deviation among transmit-receive antenna chains when transmitting signals using the transmit-receive antenna chains, and transmit-receive calibration for correcting phase and amplitude deviation between transmission and reception of a single transmit-receive antenna chain when receiving signals using the transmit-receive antenna chain and when receiving signals using the transmit-receive antenna chain.

The importance of communication antenna chain calibration is obvious from the attention it has received in, for instance, "Indoor transmission characteristics of adaptive antenna-array transmission diversity in W-CDMA downlink, Harada et al., Technical Report of The Institute of Electronics, Information and Communication Engineers, RCS99-18 (1999-05)," "Study on RF transmission and reception circuit calibration in W-CDMA downlink adaptive antenna-array transmission diversity, Harada, Tanaka, Sawabashi and Adachi, Technical Report of The Institute of Electronics, Information and Communication Engineers, RCS99-101 (1999-08)", and "Automatic calibration method for FDD system adaptive array that takes antenna characteristics into account," Nishimori, Osa, Takatori and Hori, Technical Report of The Institute of Electronics, Information and Communication Engineers, RCS99-213, MW99-233 (2000-02).

Conventional technologies related to calibration as discussed in the foregoing will now be reviewed.

In the phased array system taught by Unexamined Japanese Patent Application JP-A-8-248118, a monitor beam is transmitted from a phased array antenna toward a monitor beam antenna. When the level of the monitor beam received by the monitor beam antenna is not higher than a predefined reference level, the condition is judged abnormal and when the level of the monitor beam received by the monitor beam antenna is higher than the predefined reference level, the condition is judged to be normal. In other words, normal/abnormal condition is discriminated by determining whether the receive level is higher or lower than a reference level.

In the beam arrival direction detection method and system using the method taught by Unexamined Japanese Patent Application 2000-357911, a base station equipped with an adaptive array antenna uses an antenna chain installed independently of the adaptive array antenna to detect the directions of beams arriving from mobile stations.

In the wireless telecommunications system and wireless base station taught by Unexamined Japanese Patent Application 2001-7754, a terminal station determines the ratio between desired RF power transmitted to the terminal station from a base station equipped with an adaptive array antenna and interference RF power (D/U value) and transmits the determined value to the base station. The base station controls the weighting coefficient of each antenna device based on the determined value received from the terminal station.

In the method of regulating a transmit-receive system in an adaptive array base station and an adaptive array wireless system taught by Unexamined Japanese Patent Application 2001-53661, an adaptive array base station is configured to calculate the radio frequency amplitude and phase difference characteristics between the transmit system and receive system in each antenna and use the calculated calibration data to determine calibration that optimizes the phase and amplitude of the radio frequency transmitted from each antenna.

The problem indicated above with reference to the prior art of directivity pattern shift arising in transmit-receive antenna chains as a result of characteristic differences has already received the attention of adaptive array antenna researchers and is being overcome by calibration as explained in the foregoing. In the actual operation of commercial and other systems, however, problems such as those indicated by the following (1) to (4) can still be considered to occur.

(1) When a change occurs in a transmit-receive antenna itself or in the cable connecting the transmit-receive antenna to the base station owing to metallic expansion or contraction caused by temperature difference, such as between summer and winter, it becomes uncertain whether the error corrected by past calibration is identical to the current error.

(2) When the phase and amplitude (gain) characteristics of the transmit-receive antenna chain are markedly changed, such as by snow or wind, it becomes uncertain whether the calibration result keeps pace with the change in characteristics.

(3) A test conducted immediately before the first commercial operation does not provide certain proof that the calibration is working properly, so that doubt remains as to whether or not the error has actually been corrected by the calibration.

(4) When the central administrator managing a base station receives notification of trouble from the base station etc., it cannot easily discriminate whether the trouble is calibration related.

When any of the foregoing problems arises, reliability of the calibration operation can be assured only by having a technician from the company that built the equipment visit each site to confirm whether the calibration operation is working properly. This increases the cost of running a base station or the like equipped with adaptive array antenna capability and also complicates supervision work. Another inconvenience is that a person without expert technical knowledge is unable to ascertain whether the state of calibration operation is normal or abnormal.

The present invention was accomplished for overcoming such disadvantages of the prior art and has as its object to provide a telecommunications device that, in a system for conducting wireless telecommunications using an adaptive array antenna, enables monitoring of the transmit directivity of the adaptive array antenna, thereby ensuring highly reliable transmit directivity of the adaptive array antenna.

SUMMARY OF THE INVENTION

The present invention achieves the foregoing object by providing a telecommunications device wherein wireless signal communication is conducted using multiple communications antennas while controlling the overall directivity of the multiple antennas. The telecommunications device comprises at least one monitor antenna, installed separately from multiple communications antennas controlled to achieve a prescribed overall directivity, for wirelessly receiving signals from the multiple communications antennas, directivity information acquisition means for acquiring based on the signals received by the monitor antenna information regarding the overall directivity of the multiple communications antennas, and directivity information output means for outputting the directivity information acquired by the directivity information acquisition means to an external achieved directivity accuracy monitoring means adapted to monitor the accuracy of achieved overall directivity of the multiple communications antennas based on difference between the directivity information and directivity information predicted to be acquired by the directivity information acquisition means when the prescribed directivity is achieved.

The external achieved directivity accuracy monitoring means monitors the accuracy of achieved overall directivity of the multiple communications antennas based on the difference between the directivity information input from the directivity information output means and the directivity information predicted to be acquired by the directivity information acquisition means when the prescribed directivity is achieved.

The monitor antenna and the directivity information acquisition means acquire information regarding the actually achieved directivity from signals wirelessly transmitted from the multiple communications antennas controlled to achieve a prescribed overall directivity and the acquired information is output to the achieved directivity accuracy monitoring means by the directivity information output means. The achieved directivity accuracy monitoring means can therefore utilize the directivity information to monitor the accuracy of achieved overall directivity of the multiple communications antennas. During wireless telecommunications using an adaptive array antenna, it therefore becomes possible to monitor the transmit directivity of the adaptive array antenna and ensure its transmit directivity with high reliability using an added function simpler than required heretofore. This reduces operating costs and enables monitoring by a person without expert knowledge.

The present invention makes it possible to monitor the accuracy of the directivity achieved solely on the side of the telecommunications device including the achieved directivity accuracy monitoring means, without, for example, needing to receive information regarding directivity from the party with which communication is being conducted.

Since the invention is configured to acquire information regarding directivity and use it to monitor the accuracy of the achieved directivity, the prescribed directivity itself can be monitored.

The telecommunications device can be any of various types and can, for example, be a base station, a relay station, a mobile station or the like. The communications system used in the telecommunications device can also be any of various types such as CDMA, TDMA (Time Division Multiple Access) and FDMA (Frequency Division Multiple Access).

The telecommunications device can be one capable of both transmitting and receiving signals or one capable of transmitting signals but not receiving signals.

The multiple communications antennas can be any of various types and can be used in any of various numbers and arrangements.

Methods usable for controlling the overall directivity of the multiple communications antennas include, for example, ones referred to earlier with regard to the prior art, such as the method of multiplying the signals to be transmitted to other parties by the transmit antenna weights (weighting coefficients) of the respective communications antennas and wirelessly transmitting the results of the multiplication and the method of multiplying the received signals of the communications antennas by their respective receive antenna weights, synthesizing the results of the multiplication for all communications antennas and using the synthesis result as the received signal.

The monitor antenna can be any of various types and can be used in any of various numbers and arrangements.

In this invention, since the accuracy of achieved overall directivity of the multiple communications antennas is monitored, an antenna installed separately from the multiple communications antennas is used as the monitor antenna.

The multiple communications antennas from which signals are wirelessly transmitted to be received by the monitor antenna are controlled in antenna weight or the like so as to achieve a prescribed overall directivity of the multiple communications antennas. The prescribed directivity can, however, be any arbitrary directivity and all that is essential is that the configuration be such that information regarding the controlled directivity at the time the signals received by the monitor antenna were transmitted from the multiple communications antennas can be obtained by the achieved directivity accuracy monitoring means.

In other words, in this invention, the information regarding the accuracy of the achieved overall directivity of the multiple communications antennas actually acquired by the monitor antenna is compared with directivity information that would be predicted to be acquired at the time the signals from which the directivity information was derived were transmitted from the multiple communications antennas should the control actually achieve the intended directivity. When the two types of directivity information match, it is decided that the accuracy of the achieved overall directivity of the multiple communications antennas is good. When the two types of directivity information differ markedly it is judged that the accuracy of the achieved overall directivity is poor. The method of deciding whether the two types of directivity information match or differ can be one that finds them to match even if they are not exactly the same so long as the difference is within an acceptable range.

From this it follows that the aforesaid prescribed directivity need not be particularly limited. One possibility is for the information regarding the controlled directivity during actual wireless telecommunications to be obtained by having the monitor antenna receive the telecommunications signals wirelessly transmitted to the other party by the multiple communications antennas. In this case, the telecommunications device outputs the information regarding the directivity to the external achieved directivity accuracy monitoring means. Another possibility is that of predefining the prescribed directivity to be a specific directivity for monitoring the accuracy of the achieved directivity. In this case, information regarding the specific directivity is predefined in the achieved directivity accuracy monitoring means.

Various types of information can be used as the information regarding the overall directivity of the multiple communications antennas. For instance, information on the level of signals received by the monitor antenna can be used. (The level of signals received by the monitor antenna varies depending on the controlled directivity during transmission of the signals from the multiple communications antennas.) It is also possible to produce actual or simulated variation in the direction angle of the multiple communications antennas as viewed from the monitor antenna to produce direction angle-dependent variation in the level of the signals received by the monitor antenna and by this to acquire information regarding directivity for multiple direction angles.

The accuracy of achieved overall directivity of the multiple communications antennas can be monitored in any of various modes. Such modes include, for example, that of deciding whether the accuracy of the achieved directivity is normal or abnormal by using a threshold, that of, in this same mode, informing the user (e.g., person monitoring the condition of the telecommunications device) when the accuracy is found to be abnormal by sounding a buzzer or the like, and that of informing the user of the accuracy of the achieved directivity by displaying a numerical value or the like. Thus, in the present invention, not only is it possible to conduct fine numerical monitoring of the accuracy of the achieved directivity, it is also possible to conduct monitoring for judging whether the accuracy of the achieved directivity is good or bad with reference to some boundary.

Any of various maintenance tools and other devices can be used as the external achieved directivity accuracy monitoring means.

The timing of the processing for monitoring the accuracy of achieved overall directivity of the multiple communications antennas can be variously set. One possibility is to activate the monitoring process at regular time intervals and inform the user (e.g., person monitoring the condition of the telecommunications device) when an abnormal condition is discovered. This mode reduces the burden on the user. Another possibility is to activate the monitoring process at times when a prescribed environmental change occurs, such as when change in temperature at the site where the multiple communications antennas are installed reaches or exceeds a certain threshold. Still another possibility is to activate the monitoring process in response to an instruction from the user.

The present invention also provides a telecommunications device that further comprises a baseband signal processor equipped with the achieved directivity accuracy monitoring means and the directivity information output means, the baseband signal processor being capable of baseband processing of signals wirelessly transmitted and received using the multiple communications antennas and capable of communicating with an external monitoring unit for monitoring the telecommunications device, the directivity information acquisition means outputting acquired directivity information to the baseband signal processor and the directivity information output means outputting directivity information from the baseband signal processor to the external monitoring unit.

When the telecommunications device is monitored by an external monitoring unit, therefore, the directivity information acquired by the monitor antenna and the directivity information acquisition means are output to the external monitoring unit through the baseband signal processor provided in the telecommunications device and the monitoring unit monitors the accuracy of the achieved directivity. The configuration for monitoring directivity can therefore be simplified.

Any of various devices can be used as the external monitoring unit. In the case of a telecommunications device installed in a base station of a mobile telecommunications system, for instance, a central monitoring station for monitoring the condition of the base station can be used. Otherwise a configuration can be adopted in which the external achieved directivity accuracy monitoring means notifies the base station of information regarding the result of monitoring the accuracy of achieved directivity.

The achieved directivity accuracy monitoring means can be installed in the telecommunications device.

Thus the present invention also provides a telecommunications device wherein wireless signal communication is conducted using multiple communications antennas while controlling the overall directivity of the multiple antennas. The telecommunications device comprises at least one monitor antenna, installed separately from multiple communications antennas controlled to achieve a prescribed overall directivity, for wirelessly receiving signals from the multiple communications antennas, directivity information acquisition means for acquiring based on the signals received by the monitor antenna information regarding the overall directivity of the multiple communications antennas, and achieved directivity accuracy monitoring means for monitoring the accuracy of achieved overall directivity of the multiple communications antennas based on difference between the directivity information acquired by the directivity information acquisition means and directivity information predicted to be acquired by the directivity information acquisition means when the prescribed directivity is achieved.

The present invention also provides a telecommunications device wherein multiple monitor antennas are installed each at a different location, the directivity information acquisition means acquires information regarding overall directivity of the multiple communications antennas for each monitor antenna based on the signals received by the monitor antennas, and the achieved directivity accuracy monitoring means monitors the overall directivity of the multiple communications antennas based on difference between the directivity information for each monitor antenna acquired by the directivity information acquisition means and directivity information for each monitor antenna predicted to be acquired by the directivity information acquisition means when the prescribed directivity is achieved.

Since the overall directivity of the multiple communications antennas is monitored using multiple monitor antennas, the prescribed directivity can be monitored simultaneously or consecutively with respect to multiple direction angles. The accuracy of the achieved directivity can therefore be monitored with enhanced reliability. Monitoring the level of the transmitted signals from two or more direction angles enables high accuracy determination of whether accurate directivity has been achieved because when a given directivity has been achieved the level of the transmitted signals ordinarily differs with direction angle.

The monitor antennas can be provided in any of various numbers.

The multiple monitor antennas can be disposed in any of various arrangements. An arrangement that enables the directivity to be ascertained with enhanced accuracy is preferably adopted. One preferable arrangement is to dispose the monitor antennas at direction angles where the directional characteristics are strongly expressed, such as at the direction angles where the signal level is maximum and the direction angle where the signal level is minimum.

The information regarding directivity can be acquired for each monitor antenna and can be predicted for each monitor antenna.

The present invention also provides a telecommunications device that further comprises received signal attenuation means for attenuating signals received by the at least one monitor antenna and outputting them to the directivity information acquisition means, wherein the monitor antenna receives communications signals wirelessly transmitted from the multiple communications antennas and the directivity information acquisition means acquires information regarding the overall directivity of the multiple communications antennas based on the communications signals attenuated by the received signal attenuation means.

Therefore, even if the level of the communications signals is high, no problem arises when the at least one monitor antenna receives the communications signals wirelessly transmitted from the multiple communications antennas and the directivity information acquisition means acquires information regarding the directivity of the received signals, because the received signal attenuation means attenuates the communications signals received by the monitor antenna to a level that makes them readily processible.

The signal attenuation by the received signal attenuation means can be set to any of various degrees of attenuation (e.g., attenuations rates).

The received signal attenuation means can be a signal attenuator. In a preferable configuration, it is a variable attenuator whose rate of signal attenuation can be controlled externally. In this case, the attenuation rate of the variable attenuator can be varied in response to the level of the communications signals received by the monitor antenna.

The present invention also provides a telecommunications device that further comprises testing signal wireless transmission means that wirelessly transmits from the multiple communications antennas a plurality of different testing signals that make the effect of the overall directivity of the multiple communications antennas on the at least one monitor antenna like that of rotating the direction angle of the prescribed directivity a total of 360 degrees, wherein the monitor antenna receives the testing signals wirelessly transmitted from the multiple communications antennas by the testing signal wireless transmission means, and the directivity information acquisition means acquires information regarding overall directivity of the multiple communications antennas based on the testing signals received by the monitor antenna.

According to this telecommunications device, monitoring is conducted while using a plurality of different testing signals capable of rotating the overall directivity of the multiple communications antennas so that the direction angle with respect to the multiple communications antennas rotates from 0 degree to 360 degrees (360 degrees and 0 degree ordinarily being identical). The accuracy of the achieved directivity can therefore be reliably monitored with high accuracy.

Any of various types of testing signals can be used as the plurality of different testing signals that make the effect of the overall directivity of the multiple communications antennas on the at least one monitor antenna like that of rotating the direction angle of the prescribed directivity a total of 360 degrees. For example, a signal that imparts the effect of a prescribed directivity of direction angle $\theta$ on the monitor antenna can be adopted as a testing signal and a plurality of different signals obtained by varying the value of direction angle $\theta$ within the range of 0 degree to 360 degrees can be adopted as the plurality of different testing signals. In this case, the direction angle $\theta$ can, for instance, be set to $\theta=0$, 90, 180, 270, 360 (though 360 can be omitted because 360 degrees and 0 degree are ordinarily identical) so that the direction angle is rotated a total of 360 degrees. The angle interval can be set variously to, for example, 10 degrees, 20 degrees or the like. Or, if desired, the direction angle $\theta$ can be continuously varied from 0 degree to 360 degrees.

The present invention also provides a telecommunications device wherein the at least one monitor antenna is installed at a location near the multiple communications antennas and the testing signal wireless transmission means wirelessly transmits testing signals at a transmission power that is smaller than the transmission power of the communications signals wirelessly transmitted from the multiple communications antennas and is a transmission power receivable by the monitor antenna.

Since the transmission power of the testing signals wirelessly transmitted from the multiple communications antennas is made small, the effect of the interference that the testing signals impart on the party with which the telecommunications device according to the present invention is communicating can be reduced.

Any of various locations can be adopted as the location near the multiple communications antennas. Theoretically, the transmission power of the testing signal wirelessly transmitted from a communications antenna can be made smaller with decreasing distance between the communications antenna and the monitor antenna.

As the transmission power receivable by the monitor antenna there can, for example, be adopted a transmission power of an order that enables the directivity information acquisition means to acquire directivity information and the monitor antenna to receive the testing signals.

The present invention also provides a telecommunications device that further comprises a calibration system for calibrating for error in the characteristics of a wireless communications system for wirelessly transmitting/receiving signals using multiple communications antennas, wherein a processing section of the calibration system and a processing section of a monitor system that uses the monitor antenna to monitor the accuracy of the achieved directivity are partially or wholly constituted in common.

Therefore, since the processing section of the calibration system and the processing section of the monitor system are constituted partially or whole of common circuitry, the cost and size of the circuitry of the monitor system can be reduced.

The wireless communications system is, for instance, configured using multiple communications antennas and a baseband signal processor.

The monitor system is, for instance, configured using at least one monitor antenna and directivity information acquisition means.

The calibration system can, for example, be a processing system for conducting transmit calibration or other such calibration of the type referred to earlier regarding the prior art. Specifically, the calibration system can be constituted of an antenna that receives signals wirelessly transmitted from the multiple communications antennas and a signal processing section or the like that conducts calibration based on the signals received by the antenna.

The calibration can include the steps of detecting characteristic differences of the individual communications antenna or among the multiple communications antennas and the step of, in the monitor system, acquiring information that enables determination of the overall directivity of the multiple communications antennas.

The present invention enables the functions of the aforesaid monitor system to be incorporated in a separate unit from the telecommunications device and provides such a configuration as a telecommunications device achieved directivity accuracy monitor. The telecommunications device achieved directivity accuracy monitor of the present invention can be incorporated as an add-on in a telecommunications device without monitor capability.

More specifically, the present invention also provides a telecommunications device achieved directivity accuracy monitor for monitoring accuracy of achieved directivity in a telecommunications device that wirelessly transmits/receives signals using multiple communications antennas while controlling the overall directivity of the multiple antennas. The telecommunications device achieved directivity accuracy monitor comprises at least one monitor antenna for wirelessly receiving signals from multiple communications antennas installed in a telecommunications device and controlled to achieve a prescribed overall directivity, directivity information acquisition means for acquiring based on the signals received by the monitor antenna information regarding the overall directivity of the multiple communications antennas installed in the telecommunications device, and achieved directivity accuracy monitoring means for monitoring the accuracy of achieved overall directivity of the multiple communications antennas installed in the telecommunications device based on a difference between the directivity information acquired by the directivity information acquisition means and directivity information predicted to be acquired by the directivity information acquisition means when a prescribed directivity is achieved.

The present invention also provides a method of monitoring achieved directivity accuracy in a telecommunications device that wirelessly transmits/receives signals using multiple communications antennas while controlling the overall directivity of the multiple antennas. The method of monitoring achieved directivity accuracy in a telecommunications device comprises the steps of wirelessly receiving signals from multiple communications antennas installed in a telecommunications device and controlled to achieve a prescribed overall directivity using at least one monitor antenna installed separately of the multiple communications antennas installed in the telecommunications device, acquiring based on the signals received by the monitor antenna information regarding the overall directivity of the multiple communications antennas installed in the telecommunications device, and monitoring the accuracy of achieved overall directivity of the multiple communications antennas installed in the telecommunications device based on a difference between the acquired directivity information and directivity information predicted to be acquired when a prescribed directivity is achieved.

BRIEF EXPLANATION OF THE DRAWINGS

FIG. 7 is a diagram for explaining an example of calculating phase variation caused by physical distance between a transmit antenna and a monitor antenna.

DESCRIPTION OF THE PREFERRED EMBODIMENTS

Embodiments of the present invention will now be explained with reference to the drawings.

A CDMA base station according a first embodiment of the present invention will be explained first.

Figure 1:
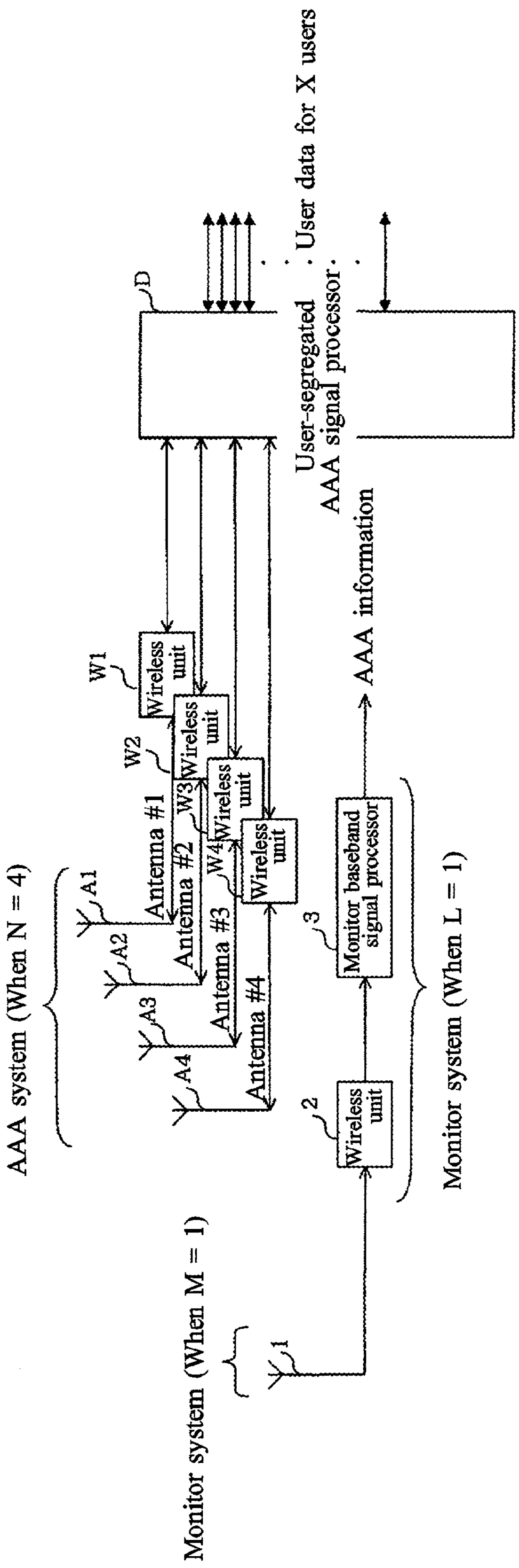
FIG. 1 is a diagram showing a CDMA base station equipped with AAA monitor capability in accordance with a first embodiment of the present invention.

The configuration of the CDMA base station is shown in FIG. 1. The CDMA base station is equipped with a system for processing transmitted and received communications signals composed of four transmit-receive antennas (antenna #1 to antenna #4) A1–A4 constituting an adaptive array antenna, four transmit-receive wireless units W1–W4 respectively associated with the four transmit-receive antennas A1–A4 and a user-segregated AAA signal processor D common to the four transmit-receive antennas A1–A4 and the four transmit-receive wireless units W1–W4. The transmit-receive wireless units W1–W4 are, for example, constituted using transceiver units (TRX) with RF signal transmit processing capability and receive processing capability.

Figure 9:
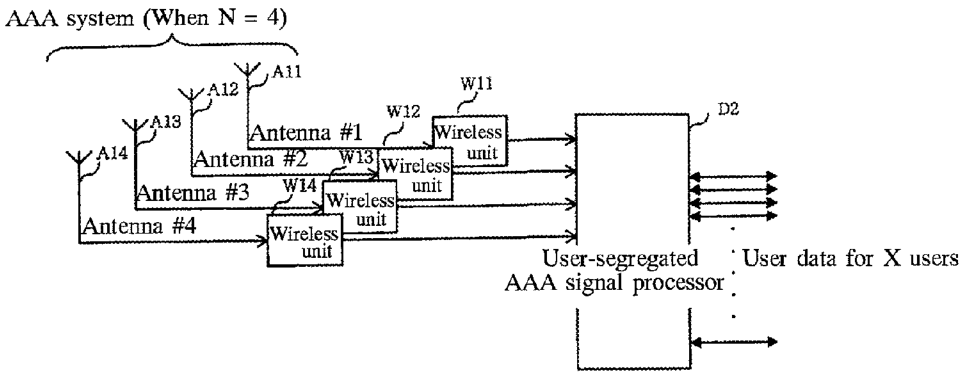
FIG. 9 is a diagram showing a conventional CDMA base station equipped with an adaptive array antenna.
Figure 10:
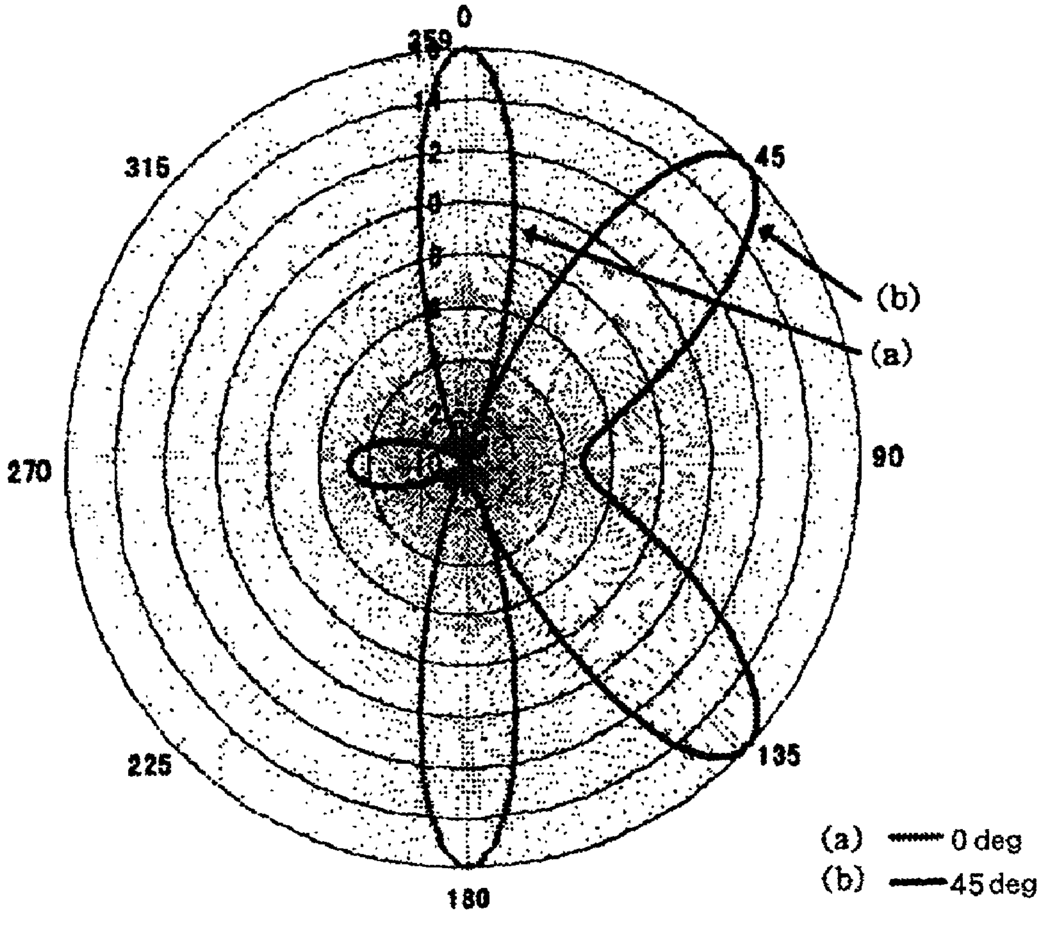
FIG. 10 is a diagram showing calculated antenna directivity.
Figure 11:
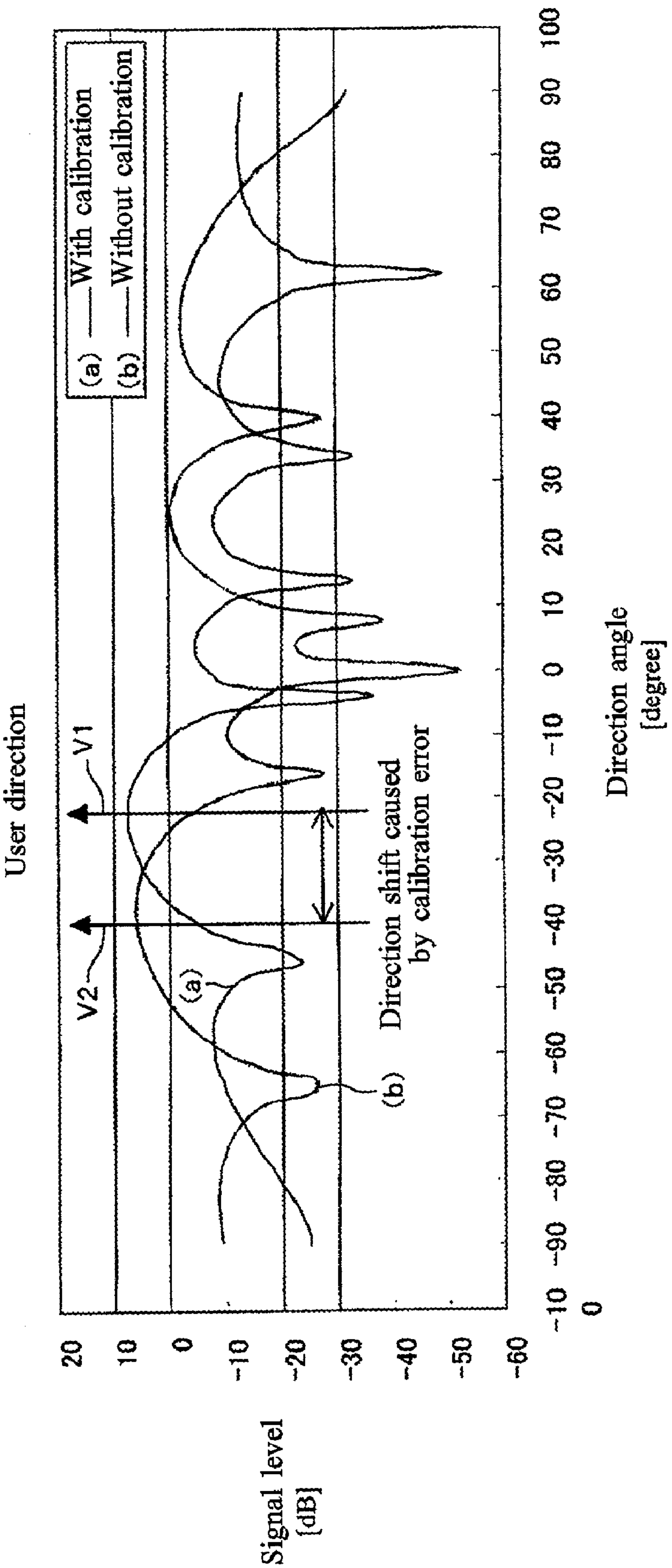
FIG. 11 is a graph showing change in directivity pattern caused by calibration error.

As in the CDMA base station shown in FIG. 9, the CDMA base station of this embodiment exemplifies a case in which the total number N (N being a natural number) of transmit-receive antennas constituting the adaptive array antenna is four and the transmit-receive antennas A1–A4 and transmit-receive wireless units W1–W4 constitute four transmit-receive antenna chains Since the four transmit-receive antenna chains and the user-segregated AAA signal processor D of this embodiment are similar in structure and operation to their counterparts in FIG. 9, they will not be explained in detail with regard to such similar aspects.

As shown in FIG. 1, the CDMA base station of this embodiment is equipped with a monitor antenna 1, monitor wireless unit 2 and monitor baseband signal processor 3, which are characterizing features of the present invention. In this embodiment, the total number M (M being a natural number) of monitor antennas is one, i.e., the CDMA base station is equipped with a single monitor antenna 1. The total number L of monitor receive chains in this embodiment is also one, i.e., the CDMA base station is equipped with a single monitor wireless unit 2 and a single monitor baseband signal processor 3. The monitor system composed of the monitor antenna 1 and monitor receive chain constitutes a path for monitoring the transmit condition of the AAA system. As exemplified by this embodiment, in one configuration, the AAA system has wireless units W1–W4 for transmitting and receiving signals, while the monitor receive chain has the monitor wireless unit 2 dedicated to reception.

The monitor antenna 1 is installed at a location closer to the four transmit-receive antennas A1–A4 than the location of a mobile station with which the CDMA base station communicates, receives signals wirelessly transmitted from the four transmit-receive antennas A1–A4, and outputs the received signals to the monitor wireless unit 2. The monitor antenna 1 receives the four wireless signals transmitted from the four transmit-receive antennas A1–A4 as superimposed signals.

The monitor wireless unit 2 converts the signals input from the monitor antenna 1 from the RF band to the baseband before outputting them to the monitor baseband signal processor 3.

Based on the signals input from the monitor wireless unit 2, the monitor baseband signal processor 3 acquires information on, for example, the level of the signals as information relating to the overall transmit directivity of the multiple transmit-receive antennas A1–A4 (AAA information).

Figure 2:
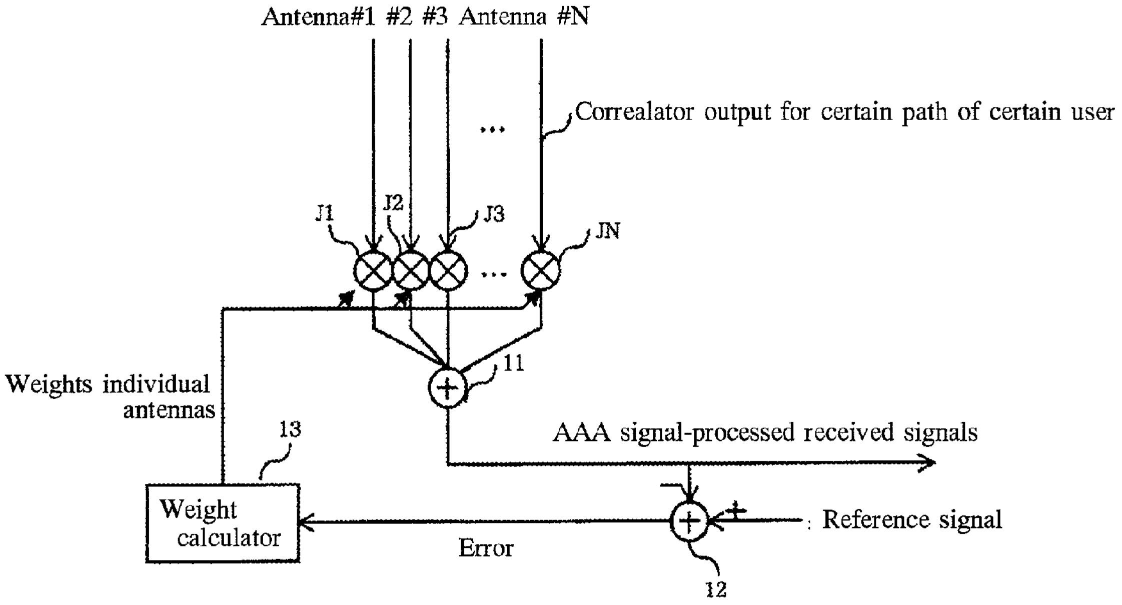
FIG. 2 is a diagram showing the configuration of an AAA signal processing section provided in a user-segregated AAA signal processor.

FIG. 2 shows the configuration of an AAA signal processing section provided in the user-segregated AAA signal processor D. Upon receiving the signals arriving via the transmit-receive antennas A1–A4, the AAA signal processing section generates an antenna weight with respect to each signal. The AAA signal processing section is equipped with as many complex multipliers J1–JN as there are transmit-receive antennas A1–A4, an adder 11, an adder 12 and, for example, a weight calculator 13 composed of, for example, a DSP (Digital Signal Processor).

The received signals input to the illustrated AAA signal processing section from the transmit-receive antennas A1–A4 and separated by user (e.g., by mobile station) are input to the respective complex multipliers J1–JN. In other words, signals separated by transmit-receive antenna A1–A4 are input to the respective complex multipliers J1–JN. When the signals wirelessly transmitted by each user arrive at the CDMA base station via a plurality of different paths, the received signals from the transmit-receive antennas A1–A4 are separated by user and by path. In the case of adopting CDMA technology as in this embodiment, the separation of signals by user and path is conducted by using a correlator to correlate each received signal with the spreading code of a user and using the spreading code to despread the received signal.

Each complex multiplier J1–JN receives the correlator output for a certain path of a certain user in the foregoing manner, further receives an antenna weight for the associated one of the transmit-receive antennas A1–A4 output by the weight calculator 13 (explained later), complex-multiplies the received correlator output signal and antenna weight, and outputs the result of the complex multiplication to the adder 11. The antenna weights of the individual transmit-receive antennas A1–A4 are, for example, complex number values (complex weighting coefficients).

The adder 11 sums the N number of complex multiplication results received from the N number of complex multipliers J1–JN and the summing result is output as the received signal processed by the adaptive array antenna function. In this embodiment, user data for X users (X being a natural number) are acquired from the sum signal output from the adder 11.

The adder 12 is input with part of the summing result output from the adder 11, is further input with a reference signal that is predicted to correspond to the part of the summing result when ideal antenna weights are generated, calculates the error of the AAA control from the difference between the input part of the summing result and the input reference signal, and outputs the calculated error to the weight calculator 13. The function of the adder 12 can be achieved by a subtractor that subtracts said part of the summing result from the reference signal or vice versa.

The weight calculator 13 generates antenna weights for the individual transmit-receive antennas A1–A4 and outputs them to the complex multipliers J1–JN. In the course of generating the antenna weights for the individual transmit-receive antennas A1–A4, it controls the generation process based on the information received from the adder 12 so as to minimize error. The weight calculator 13 conducts the antenna weight generation processing based on a weight generation algorithm such as LMS (Least Mean Square). This embodiment utilizes ordinary LMS.

An example of the operation conducted by the monitor system provided in the CDMA base station of this invention will now be explained with reference to FIG. 3.

This figure shows the four transmit-receive antennas A1–A4 provided in the CDMA base station of this embodiment installed at four locations equally spaced on a circle, together with an example of the overall directivity pattern formed by the four transmit-receive antennas A1–A4 during transmission. The figure also shows the monitor antenna 1 provided in the CDMA base station of this embodiment, together with two mobile stations P0, P1 with which the CDMA base station of this embodiment communicates wirelessly.

In this example, the two mobile stations P0, P1 are present in the vicinity of the CDMA base station and each acts as an interference source with respect to the other. In the illustrated example, the CDMA base station of this embodiment is wirelessly transmitting communications signal to the one mobile station P0 (the target mobile station). In such a case, the overall transmit directivity of the multiple transmit-receive antennas A1–A4 during transmission of communications signals should preferably be such as to establish a directivity pattern that minimizes the signal level toward the other mobile station (interference mobile station) P1 (ideally reduces it to a signal level of zero) and the maximizes the signal level toward-the one mobile station P0 (maximizes directivity in the direction of the mobile station P0).

Figure 3:
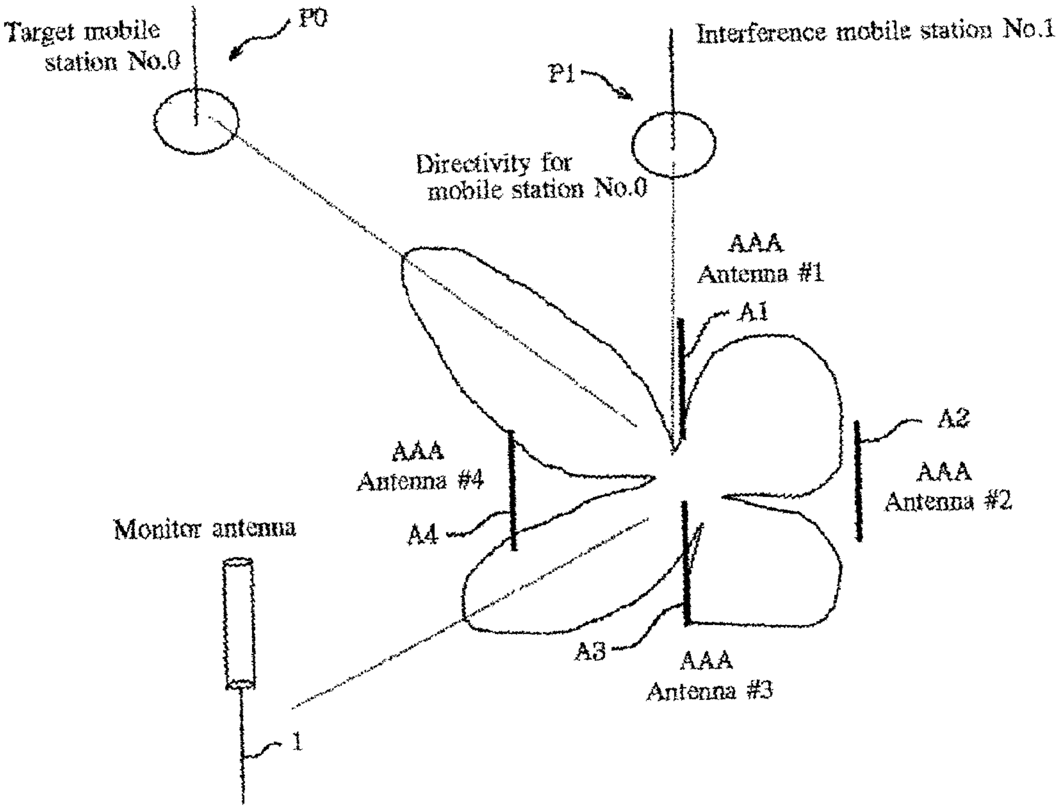
FIG. 3 is a diagram showing an example of the relationship between a directivity pattern and a monitor antenna.

While the CDMA base station should ideally form a transmit directivity pattern like that shown in FIG. 3, whether or not it actually forms such an indeal directivity pattern as a result of calibration and other factors is not certain for the reasons discussed earlier regarding the problems of the prior art.

This embodiment is, however, equipped with a monitor system including the monitor antenna 1 and uses this monitor system to determine whether or not the ideal transmit directivity pattern is actually formed.

The formation of the overall transmit directivity pattern of the multiple transmit-receive antennas A1–A4 is substantially the responsibility of a transmit-receive baseband signal processor. The directivity pattern is formed using the different user-specific sets of antenna weights that the transmit-receive baseband signal processor generates for the individual transmit-receive antennas A1–A4. With regard to the signals transmitted from the transmit-receive antennas A1–A4 in the direction of the monitor antenna 1, therefore, it is possible to calculate the level of the signals that should be received by the monitor antenna 1 and acquired by the monitor system as a predicted signal level.

In the monitor system, the signals wirelessly transmitted from the multiple transmit-receive antennas A1–A4 are received by the monitor antenna 1, down-converted by the monitor wireless unit 2, and sent to the monitor baseband signal processor 3. The monitor baseband signal processor 3 detects the level of the received signals and outputs the detection result as AAA information. Ideally, the level of the received signals detected in this manner should be the same as the predicted signal level. In this embodiment, therefore, the detected received signal level and the predicted signal level are compared. When the difference between the two levels if found to be small, i.e., less than a predefined threshold, the calibration of the transmit-receive antenna chains is deemed to be accurate. When the difference between the two levels is found to be large, i.e., equal to or greater than the threshold, it is deemed that either the calibration of the transmit-receive antenna chains is not accurate or that the calibration result has shifted owing to, for instance, environmental changes.

In other words, the fact that a large discrepancy is present between the received signal level detected by the monitor system and the predicted signal level means that the actually achieved overall transmit directivity pattern of the multiple transmit-receive antennas A1–A4 markedly deviates from the transmit directivity the control system is trying to establish.

The present embodiment is configured to enable monitoring of the accuracy of achieved transmit directivity and for this purpose is equipped with the monitor antenna 1, the monitor wireless unit 2 with at least receive capability, and the monitor baseband signal processor 3. When, as in the present embodiment, CDMA is utilized, the monitor baseband signal processor 3 is provided with CDMA despread processing capability and is supplied with spreading code signals, spreading code generation timing signals and other such signals required for despread processing.

As explained with reference to FIG. 3, in this embodiment the monitor system makes it possible to ascertain whether or not the transmit directivity pattern established by the AAA function is accurately formed. When the transmit directivity pattern established by the AAA function is not accurately formed, the result may be, for example, that maximum RF radiation is directed toward the wrong user (e.g., toward the other mobile station P1), in which case the system capacity is reduced rather than increased. The present embodiment enables detection and avoidance of such an undesirable situation.

As explained in the foregoing, in the CDMA base station of this embodiment, when the transceiver of a CDMA base station with N number of transmit-receive antennas that conducts wireless telecommunications using digital modulation-demodulation is provided with adaptive array antenna capability wherein the N number of transmit-receive antennas individually receive and transmit signals in the carrier frequency band (RF band), the CDMA base station is equipped with monitor capability for observing the transmitting power of the N number of transmit-receive antennas, more specifically, is equipped with M number of monitor antennas, L number of monitor wireless units for down-converting the output signals from the M number of monitor antennas to an intermediate frequency band or baseband, and L number of monitor baseband signal processors for extracting signals to be observed from the signals output from the L number of monitor wireless units and acquiring and outputting level and other information regarding the extracted signals.

Here N is defined as a natural number not smaller than 2, M as a natural number not smaller than 1, and L as a natural number not smaller than 1. In the basic configuration L=M. In this embodiment, N=4, M=1 and L=1. These numbers can be changed variously. In the present embodiment, the overall directivity of transmit-receive antennas constituting an adaptive array antenna is monitored so the total number N of transmit-receive antennas is greater than one. However, a monitor function like that of this embodiment can also be applied to a telecommunications device that conducts wireless telecommunications with a single transmit-receive antenna (N=1) that consists of, for example, a directional antenna.

The CDMA base station of the present embodiment thus incorporates monitoring capability for determining the correctness (appropriateness) of the correctness of the calibration required during transmission in a telecommunications device equipped with an adaptive array antenna and by using this capability can monitor for occurrence of calibration error attributable to unreliability of the calibration itself or to environmental change following correct calibration. This makes it possible to ascertain whether or not the antenna weights of the adaptive array antenna are being correctly generated and thus to prevent lowering of system capacity by formation of incorrect directivity patterns.

The present embodiment constitutes an application of the invention to a base station utilizing CDMA technology. When the present invention is instead applied to a TDMA base station, the fact such a base station transmits communications signals during timeslots allocated separately for each user (e.g., each mobile station) makes it necessary to provide the monitor processing with the timing at which the monitor system is notified by the transmit-receive antenna chains of the timeslot allocated to the user to which the communications signals that are the subject of the directivity information measurement are addressed and during which the communications signals are transmitted to the user.

In the present embodiment, information regarding the level of the signals received by the monitor antenna 1 is output from the monitor baseband signal processor 3 as directivity information. Alternatively, however, an arrangement can be adopted in which threshold information for determining whether the receive level is normal is defined in the monitor baseband signal processor 3, the monitor baseband signal processor 3 determines whether the receive level is within a preset error range, and, based on the determination result, the monitor baseband signal processor 3 outputs an OK signal indicating that the receive level is within the error range and normal or an NG signal indicating that it is outside the error range and abnormal.

The embodiment explained in the foregoing is equipped with a single monitor antenna 1. When multiple monitor antennas are provided, the number of monitoring points becomes two or greater. In such a case, level measurement can be made with respect to the overall directivity pattern of the multiple transmit-receive antennas from multiple direction angles. As a result, the directivity pattern can be measured with still higher accuracy. A configuration equipped with multiple monitor antennas requires a larger number of components and is therefore likely to be higher in cost. Since the level information and the like regarding the signals received by all monitor antennas need not necessarily be measured at the same time, however, cost can be kept down by making the total number L of monitor receive chains smaller than the total number M of monitor antennas (M>L). In such a configuration, switching capability is incorporated for switching among the multiple monitor antennas when the received signals output from the multiple monitor antennas are forwarded to the monitor wireless unit(s) that follow.

In this embodiment, the multiple communications antennas of the present invention are constituted by the function of the multiple transmit-receive antennas A1–A4, the at least one monitor antenna is constituted by the function of the monitor antenna 1, the directivity information acquisition means is constituted by the function of the monitor baseband signal processor 3, and the directivity information output means is constituted by the function of the monitor baseband signal processor 3. While the function of the achieved directivity accuracy monitoring means is established externally in this embodiment, it can instead be incorporated in the monitor system or the transmit-receive antenna system.

A configuration obtained by incorporating an attenuator in the monitor system of the foregoing CDMA base station will now be explained. This configuration overcomes the following problem that may be encountered when communications signals received by the monitor antenna 1 are down-converted by the monitor wireless unit 2. It can be considered that the monitor antenna 1 will ordinarily be installed near the adaptive array antenna of the base station. The communications signals transmitted from the adaptive array antenna of the base station are required to reach the outermost limit of the area covered by the base station. These communications signals are therefore transmitted at very high power. Because of this, the power of the communications signals received by a receive antenna located near the adaptive array antenna (by the monitor antenna 1 in the present case) may be so excessively high as to produce distortion that makes accurate receive processing impossible if not eliminated.

This embodiment overcomes this problem by incorporating an attenuator in the monitor wireless unit 2 and using it to attenuate the communications signals received by the monitor antenna 1.

In the intended use of this embodiment, it is basically impossible to predict when the monitor function will be activated. In view of this, it is better to use a variable attenuator whose attenuation rate can be varied than an attenuator with a fixed attenuation rate.

This is related to the fact that on some occasions the number of mobile stations present in the area covered by the base station is small and the transmission power of the communications signals from the base station is therefore low, while on other occasions many mobile stations are located near the outer edge of the area covered by the base station so that the transmission power of the communications signals transmitted by the base station is high. Owing to this dynamic range of the communications signal transmission power, the attenuation rate of the variable attenuator is preferably adjusted in response to the transmission power of the communications signals transmitted from the adaptive array antenna or the power of the communications signal received by the monitor antenna 1 so as to maintain the level of the signals received by the monitor system constant.

As explained in the foregoing, this modified embodiment of the CDMA base station is provided upstream of the L number of monitor wireless units 2 with L number of attenuators. The communications signals received by the monitor antennas are lowered in level by the associated attenuators before being down-converted by the associated monitor wireless units.

In this embodiment of the CDMA base station, therefore, communications signals having high transmission power are attenuated in the monitor system so that the level of the communications signals can be lowered to an easily possible level. When the attenuators are variable attenuators, moreover, variation in the dynamic range of the transmission power from the adaptive array antenna can be tracked to enable monitoring that is responsive to the variation.

In this embodiment, the received signal attenuation means of the invention is constituted by the attenuators or the variable attenuators.

A CDMA base station that is a second embodiment of the present invention will now be explained.

Figure 4:
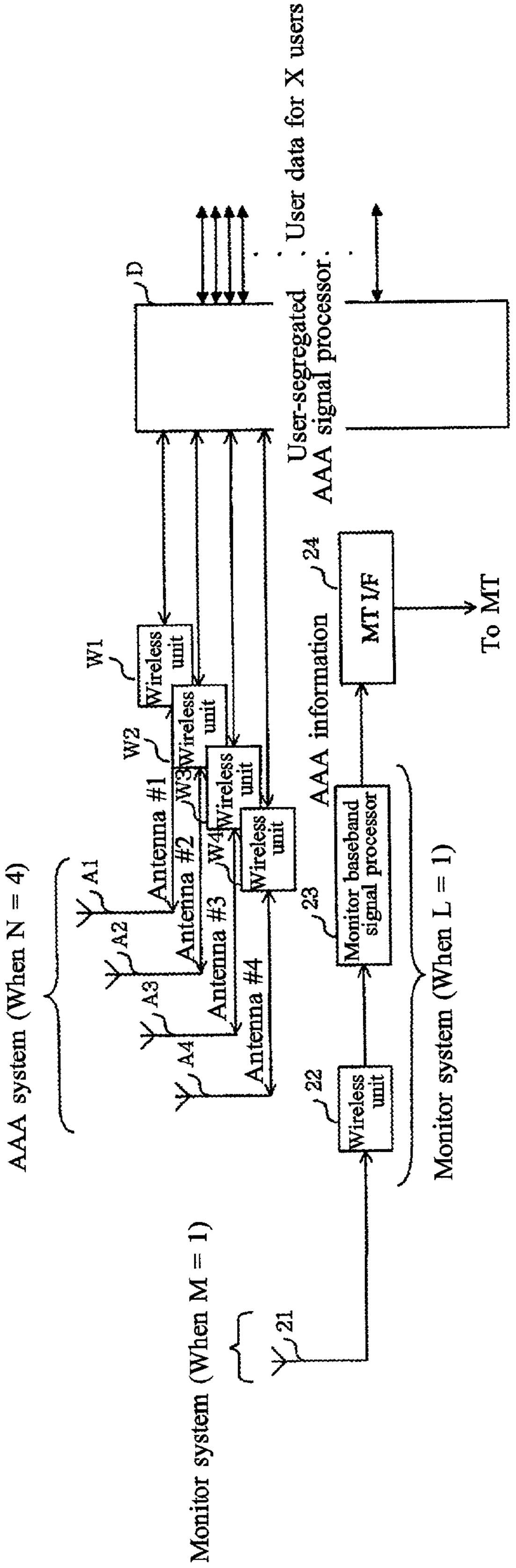
FIG. 4 is diagram showing a CDMA base station equipped with a function for outputting to an external maintenance tool information acquired by an AAA monitor function according to a second embodiment of the present invention.

The structure of the CDMA base station of this embodiment is shown in FIG. 4. The CDMA base station is equipped with four transmit-receive antennas A1–A4 constituting a transmit-receive antenna system, four transmit-receive wireless units W1–W4 and a user-segregated AAA signal processor D. The CDMA base station of this embodiment is further equipped with a monitor system composed of a monitor antenna 21, monitor wireless unit 22, monitor baseband signal processor 23, and maintenance tool interface (MT I/F) 24.

The configuration and operation of transmit-receive antenna system of this embodiment are similar to those of the transmit-receive antenna system of the first embodiment described earlier with reference to FIG. 1. For convenience of explanation, the constituent elements A1–A4, W1–W4 and D are assigned the same reference symbols as their counterparts in FIG. 1.

The configuration and operation of the monitor antenna 21, monitor wireless unit 22 and monitor baseband signal processor 23 are similar to those of their counterparts 1 to 3 shown in FIG. 1 and described earlier with reference to the first embodiment. In the present embodiment, the monitor baseband signal processor 23 outputs the AAA information acquired as directivity information to the maintenance tool interface 24.

The maintenance tool interface 24 serves as an interface between the monitor system and an external maintenance tool. The AAA information output by the monitor baseband signal processor 23 is output to the external maintenance tool through the maintenance tool interface 24.

The external maintenance tool is constituted by, for example, a personal computer that is capable of communicating with the maintenance tool interface 24 etc. to ascertain various states of the CDMA base station.

The maintenance tool interface 24 incorporates a communications control program and a communications device, and is capable of responding to various commands received from the maintenance tool and decoding the commands for sending designated values to the maintenance tool. In order to enable the specifications of the maintenance tool to be set in response to the operator installing the base station, the maintenance tool interface 24 is made capable of adding/deleting items to from the foregoing particulars.

The CDMA base station of this embodiment thus outputs AAA information acquired by L number of monitor baseband signal processors through a maintenance tool interface to a device for maintaining the equipment incorporated in the adaptive array antenna (a maintenance tool).

With the CDMA base station of this embodiment, therefore, the user operating the maintenance tool can easily and simply ascertain the current operating condition of the adaptive array antenna.

In this embodiment, the directivity information output means of the invention is constituted by the maintenance tool interface 24.

Although the function of the achieved directivity accuracy monitoring means is incorporated in the external maintenance tool in this embodiment, this function can instead be incorporated in, for example, the monitor system or the transmit-receive antenna system.

A CDMA base station that is a third embodiment of the present invention will now be explained.

Figure 5:
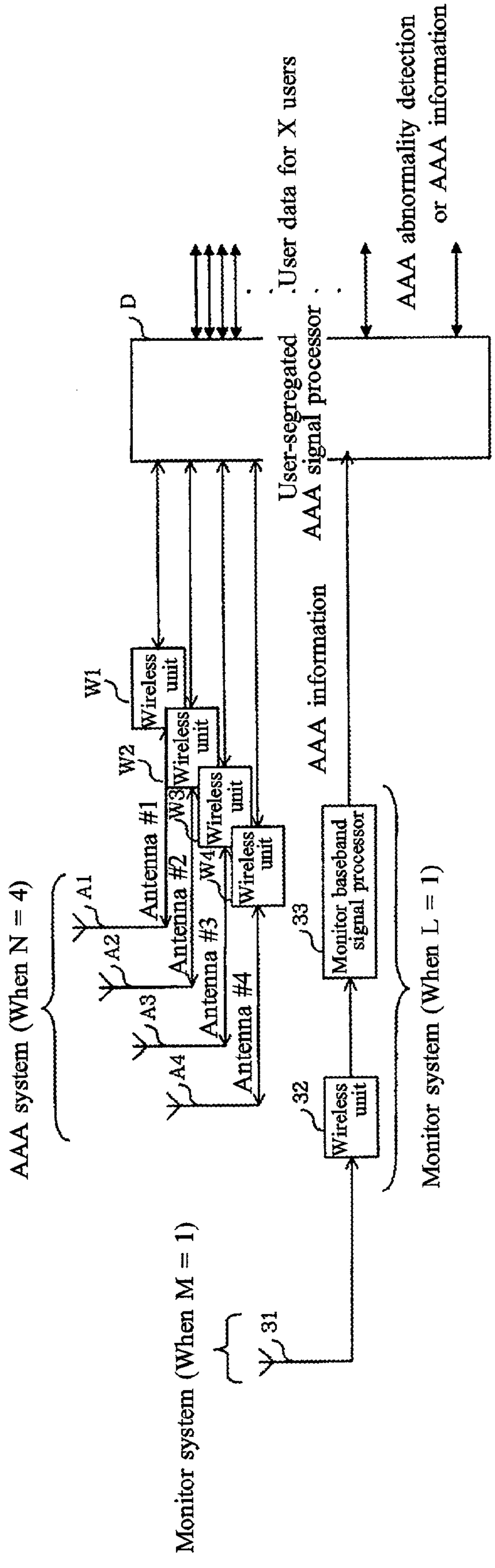
FIG. 5 is a diagram showing a CDMA base station equipped with a function for feeding back to a BTS information acquired by an AAA monitor function according to a third embodiment of the present invention.

The structure of the CDMA base station of this embodiment is shown in FIG. 5. The CDMA base station is equipped with four transmit-receive antennas A1–A4 constituting a transmit-receive antenna system, four transmit-receive wireless units W1–W4 and a user-segregated AAA signal processor D. The CDMA base station of this embodiment is further equipped with a monitor system composed of a monitor antenna 31, monitor wireless unit 32 and monitor baseband signal processor 33.

The configuration and operation of transmit-receive antenna system of this embodiment are similar to those of the transmit-receive antenna system of the first embodiment described earlier with reference to FIG. 1, except for the point that the user-segregated AAA signal processor D of this embodiment is additionally provided with AAA information communications capability. For convenience of explanation, the constituent elements A1–A4, W1–W4 and D are assigned the same reference symbols as their counterparts in FIG. 1.

The configuration and operation of the monitor antenna 31, monitor wireless unit 32 and monitor baseband signal processor 33 are similar to those of their counterparts 1 to 3 shown in FIG. 1 and described earlier with reference to the first embodiment. In the present embodiment, the monitor baseband signal processor 33 outputs the AAA information acquired as directivity information to the user-segregated AAA signal processor D.

In the present embodiment, the AAA information acquired by the monitor system is reported to a BTS (Base Transceiver Station) and through the BTS to a central monitoring station. In this embodiment, the embodiment's CDMA base station corresponds to the BTS.

Generally, the base station is remotely controlled by the central monitoring station. The base station constantly transmits information regarding its own condition to the central monitoring station, and the present embodiment is configured to constantly report the operating condition of the adaptive array antenna function using a transmission line provided for this kind of transmission. This reduces the cost of adding the monitoring function because the monitoring of the AAA function can be realized using an existing communications line.

More specifically, the user-segregated AAA signal processor D of this embodiment is connected with the central monitoring station via a communications line and sends the AAA information received from the monitor baseband signal processor 33 to the central monitoring station over the communications line.

Based on the AAA information received from the user-segregated AAA signal processor D, the external central monitoring station determines whether or not the accuracy of the achieved directivity is normal. When it determines that it is not normal, it transmits information to this effect to the user-segregated AAA signal processor D over the communications line, whereby the user-segregated AAA signal processor D receiving the information is informed that an abnormality has occurred.

Thus, in the CDMA base station of the present embodiment, the AAA information acquired by the monitor baseband signal processor 33 is output to the user-segregated AAA signal processor D that baseband signal processes the signals transmitted and received using the adaptive array antenna, the AAA information is output from the user-segregated AAA signal processor D to the central monitoring station, and the central monitoring station processes the information to detect abnormality and the like of the AAA performance.

In the case of the CDMA base station of this embodiment, therefore, the central monitoring station can conduct blanket monitoring of various states of the CDMA base station having AAA capability. The need for on-site field inspection of the CDMA base station can therefore be eliminated. Moreover, the CDMA base station of this embodiment requires less circuitry for reporting the AAA information (the monitoring result) to an external device than does the CDMA base station configured according to the second embodiment illustrated in FIG. 4. Cost can therefore be minimized.

The monitor system and the transmit-receive antenna system of this embodiment do not necessarily need to be considered separately. Therefore, the function of the monitor baseband signal processor 33 of the monitor system can, for example, be incorporated in the user-segregated AAA signal processor D or elsewhere in the BTS.

In the present embodiment, the baseband signal processor for conducting received signal baseband processing and processing for communications with the external monitoring unit is constituted by the user-segregated AAA signal processor D, and the external monitoring unit is constituted by the external central monitoring station.

Further, in this embodiment, the function of the directivity information output means is incorporated in the user-segregated AAA signal processor D, and the function of the achieved directivity accuracy monitoring means is incorporated in the external central monitoring station.

A CDMA base station that is a fourth embodiment of the present invention will now be explained.

Figure 6:
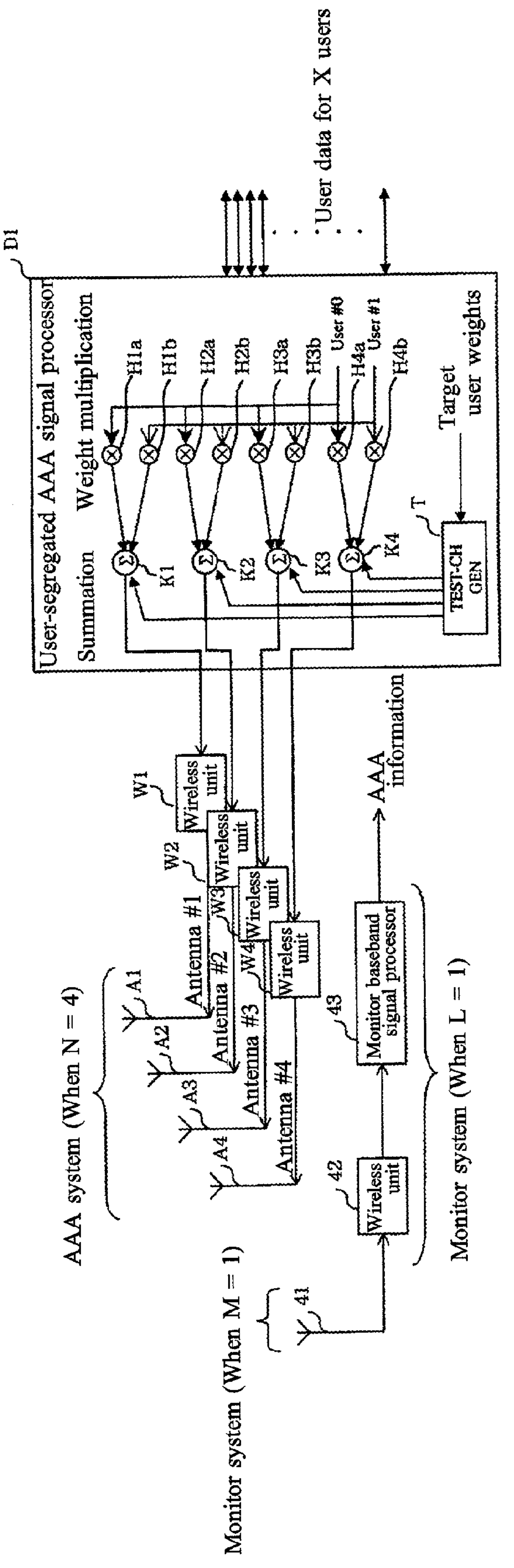
FIG. 6 is a diagram showing a CDMA base station equipped with an AAA monitor function using test signals according to a fourth embodiment of the present invention.

The structure of the CDMA base station of this embodiment is shown in FIG. 6. The CDMA base station is equipped with four transmit-receive antennas A1–A4 constituting a transmit-receive antenna system, four transmit-receive wireless units W1–W4 and a user-segregated AAA signal processor D1. The CDMA base station of this embodiment is further equipped with a monitor system composed of a monitor antenna 41, monitor wireless unit 42 and monitor baseband signal processor 43.

The configuration and operation of transmit-receive antenna system of this embodiment are similar to those of the transmit-receive antenna system of the first embodiment described earlier with reference to FIG. 1, except for the point that the user-segregated AAA signal processor D1 of this embodiment is configured to transmit test signals for monitoring transmit directivity. For convenience of explanation, the constituent elements A1–A4, W1–W4 and D are assigned the same reference symbols as their counterparts in FIG. 1.

The configuration and operation of the monitor antenna 41, monitor wireless unit 42 and monitor baseband signal processor 43 are similar to those of their counterparts 1 to 3 shown in FIG. 1 and described earlier with reference to the first embodiment, except for the point that they are configured to conduct monitoring using the aforesaid test signals.

As shown in FIG. 6, the AAA signal processor D1 of this embodiment is equipped with four complex multipliers (weighting multipliers) H1*a*–H4*a* for complex-multiplying communications signals transmitted to a first user (User #0: typically a first mobile station) and first user-specific antenna weights for the individual transmit-receive antennas A1–A4, four complex multipliers (weighting multipliers) H1*b*–H4*b* for complex-multiplying communications signals transmitted to a second user (User #1: typically a second mobile station) and second user-specific antenna weights for the individual transmit-receive antennas A1–A4, four adders K1–K4 for summing the complex multiplication results for all users for each transmit-receive antenna A1–A4, and a test channel generator T for generating channel signals for testing (test signals).

Although this embodiment is configured to AAA-process communications signals of two users (User #0 and User #1), the number of users is not limited to two can be any of various numbers. Ordinarily, each of the transmit-receive antennas A1–A4 is equipped with as many complex multipliers as there are users.

The complex multipliers H1*a*–H4*a* for the first user complex-multiply the communications signals transmitted to the first user and first user-specific transmit antenna weights for the individual transmit-receive antennas A1–A4 and output the complex-multiplication results for the individual transmit-receive antennas A1–A4 to the adders K1–K4.

The complex multipliers H1*b*–H4*b* for the second user complex-multiply the communications signals transmitted to the second user and second user-specific transmit antenna weights for the individual transmit-receive antennas A1–A4 and output the complex-multiplication results for the individual transmit-receive antennas A1–A4 to the adders K1–K4.

The test channel generator T complex-multiplies transmit antenna weights that are defined for the individual transmit-receive antennas A1–A4 with respect to a specified user (target user: typically a specified mobile station) and are to be used for monitoring directivity and a prescribed signal common to all transmit-receive antennas A1–A4 and outputs the complex-multiplication results for the individual transmit-receive antennas A1–A4 to the adders K1–K4 of the individual transmit-receive antennas A1–A4 as test signals.

The adders K1–K4 associated with the individual transmit-receive antennas A1–A4 sum the complex-multiplication results for all users received from the associated complex multipliers H1*a*–H4*a* and H1*b*–H4*b* and the test signals received from the test channel generator T and output the results of summing all received signals to the transmit-receive wireless units W1–W4 of the individual transmit-receive antennas A1–A4. In this embodiment, therefore, at the time of wirelessly transmitting communications signals to a user (e.g., a mobile station) from the multiple transmit-receive antennas A1–A4, the test signals added to the communications signals are also wirelessly transmitted.

The monitoring process in the present embodiment will now be explained in detail.

In the first to third embodiments, whether or not the AAA is performing normally or abnormally is determined by comparing the level of the communications signals actually received by the monitor antenna and the predicted receive level obtained by calculation. In the present embodiment, simple signals are added to the communications signals as test signals so that a directivity pattern like that shown in FIG. 3 can be observed from a number of different direction angles. Thus, differently from in the first to third embodiments, whose monitor systems acquire information regarding the level of the transmitted beam pattern for certain designated user (e.g., a certain mobile station) in a certain direction angle, this embodiment is configured so that the monitor system acquires information regarding the entire transmitted beam pattern.

This embodiment transmits test signals using a dedicated test channel. When provision of a dedicated channel is difficult, however, the test signals can be transmitted using the channel of a user not transmitting or receiving signals. When CDMA is adopted as in this embodiment, orthogonality is required among the channels with respect to the test signals. Signal processing peculiar to CDMA is conducted by, for example,using a scramble code or channelization code.

In this embodiment, in order to monitor directivity patterns like the one shown in FIG. 3, the signals supplied from the AAA signal processor D1 to the individual transmit-receive antennas A1–A4 are modified slightly.

In the AAA processing implemented by the configuration shown in FIG. 6, the level (e.g., power level) F of a signal that, for example, the mobile station (target mobile station) P0 shown in FIG. 3 receives from the CDMA base station of the present embodiment is represented by Equation 1.

$$F=|w1\cdot s0\cdot\phi1+w2\cdot s0\cdot\phi2+w3\cdot s0\cdot\phi3+w4\cdot s0\cdot\phi4|^2 \quad \text{(Eq. 1)}$$

In this equation, w1–w4 represent complex number transmit antenna weights (complex multiplication coefficients peculiar to AAA) of the transmit-receive antennas A1–A4.

In the case of CDMA, for example, s0 represents demodulated data (complex signal) after spreading transmitted to the mobile station P0 that is the target of the transmission.

Each of φ1–φ4 is a term representing phase change dependent on physical distance from an transmit-receive antenna A1–A4 of the adaptive array antenna to the mobile station P0 that is the target of the transmission.

Although strictly speaking Equation 1 also includes an interference component associated with, for example, the mobile station (interference mobile station) P1 shown in FIG. 3, this component was omitted from the equation in the interest of simplicity and also because consideration is not given here to a multipath environment in which waves arrive not only directly but also by reflection from hills, buildings and the like.

Moreover, Equation 1 does not enable observation of the directivity pattern over the whole 360-degree range of direction angles but indicates the level only a given direction angle (e.g., at one given point in the directivity pattern shown in FIG. 3).

In order to generate a 360-degree directivity pattern such as shown in FIG. 3 by simulation, it is necessary to vary the parameters in Equation 1.

When it is desired to examine the directivity pattern for a certain user (typically a certain mobile station), transmit antenna weights w1–w4 identical with the ones used to transmit reference signals to the user are supplied to the test channel generator T and the phase of the test signals supplied to the transmit-receive antennas A1–A4 are varied so that the receive levels of all direction angles over the range of 360 degrees can be measured at the site where the monitor antenna 41 is installed (monitor point).

Since the actual location of the target mobile station P0 and the location of the monitor antenna 41 are different, the aforesaid generation of test signals is carried out with φ1–φ4 replaced by ξ1–ξ4, which are terms that take the phase change caused by difference in location into account. That is to say, ξ1–ξ4 are terms representing phase shift caused the physical distance from the respective transmit-receive antennas A1–A4 of the adaptive array antenna and the monitor antenna 41.

The phase-shift terms ξ1–ξ4 will be explained with reference to FIG. 7.

For simplicity of explanation, the figure shows the four transmit-receive antennas A1–A4 spaced equidistantly on a straight line and shows the monitor antenna 41 located in a direction perpendicular to the straight line connecting the four transmit-receive antennas A1–A4.

The distance d between adjacent ones of the transmit-receive antennas A1–A4 is shown to be 0.5λ and the distance between the transmit-receive antenna A4 and the monitor antenna 41 to be (n·λ). Here, λ represents the wavelength of the wirelessly transmitted signals (test signals) and n is a natural number.

In the illustrated example, the monitor antenna 41 and the transmit-receive antenna A4 are separated by distance L4=(n·λ), the monitor antenna 41 and the transmit-receive antenna A3 are separated by distance $L3=\{(1/2)^2+n^2\}^{1/2}\lambda$, the monitor antenna 41 and the transmit-receive antenna A are separated by distance $L2=\{1^2+n^2\}^{1/2}\lambda$, and the monitor antenna 41 and the transmit-receive antenna A1 are separated by distance $L1=\{(3/2)^2+n^2\}^{1/12}\lambda$. The phase-shift terms ξ1–ξ4 are equal to the products of the distances L1–L4 and (2π/λ). Specifically, the phase shift associated with transmit-receive antenna A4 is ξ4=2nπ, the phase shift associated with transmit-receive antenna A3 is $\xi3=2\{(1/2)^2+n^2\}^{1/2}\pi$, the phase shift associated with transmit-receive antenna A2 is $\xi2=2\{1^2+n^2\}^{1/2}\pi$, and the phase shift associated with transmit-receive antenna A1 is $\xi1=2\{(3/2)^2+n^2\}^{1/2}\pi$.

When the vector components making up the array response vector h(θ) determined by the incidence angle θ of a signal reaching the adaptive array antenna at a direction angle θ are represented by ψ1–ψ4 as components associated with the transmit-receive antennas A1–A4, respectively, the level (e.g., power level) F(θ) of a test signal received by the monitor antenna 41 is represented by Equation 2.

$$F(\theta)=|w1\cdot s0\cdot\xi1\cdot\psi1+w2\cdot s0\cdot\xi2\cdot\psi2+w3\cdot s0\cdot\xi3\cdot\psi3+w4\cdot s0\cdot\xi4\cdot\psi4|^2 \quad \text{(Eq. 2)}$$

The array response vector h(θ) is represented by Equation 3, where j is an imaginary number.

$$h(\theta)=\begin{pmatrix}\Psi1\\ \Psi2\\ \Psi3\\ \Psi4\end{pmatrix}=\begin{pmatrix}1\\ e^{(j\cdot 2\pi\cdot d\cdot\sin\theta)/\lambda}\\ e^{(j\cdot 2\pi\cdot 2d\cdot\sin\theta)/\lambda}\\ e^{(j\cdot 2\pi\cdot 3d\cdot\sin\theta)/\lambda}\end{pmatrix} \quad \text{(Eq. 3)}$$

In Equation 3, θ represents direction angle where the front direction of the linearly arranged adaptive array antenna is defined as 0 degree (θ=0 degree–360 degree).

Figure 8:
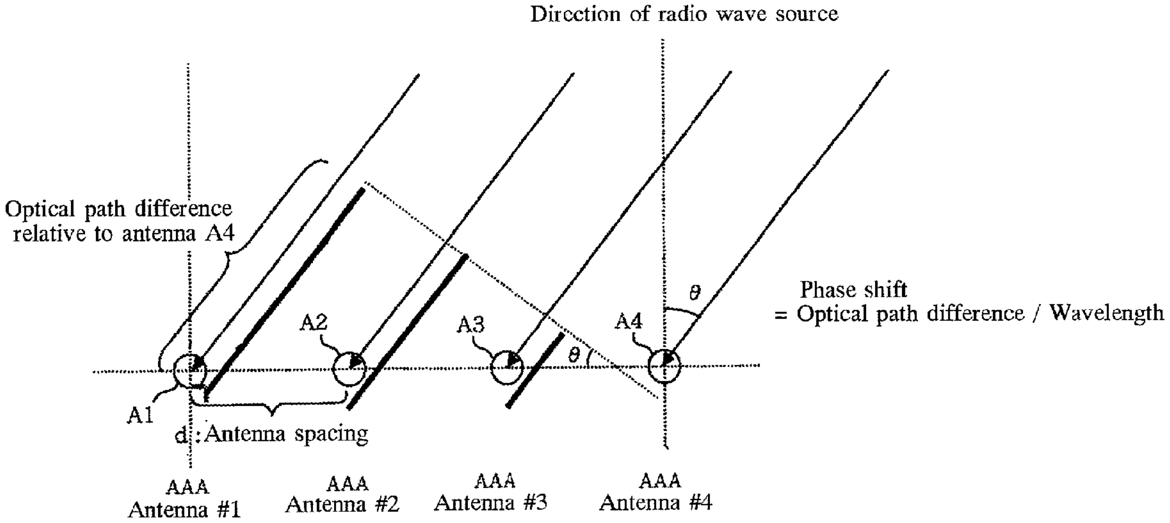
FIG. 8 is a diagram for explaining an example of how an array response vector is calculated.

When θ is rotated by 360 degrees, the angle of signal incidence to the adaptive array antenna appears to rotate by 360 degrees.

ψ1–ψ4 will now be concretely explained with reference to FIG. 8.

This figure, like FIG. 7, shows the four transmit-receive antennas A1–A4 spaced equidistantly on a straight line. The radio wave source is in the direction of angle θ relative to a line drawn normal to the straight line and the signal (radio wave) is shown to arrive from that direction. In the example of FIG. 8, a portion of the signal arrives first at the transmit-receive antenna A4 and at this point in time the same signal portion has not yet reached the other transmit-receive antennas A2–A4. A phase shift therefore arises among the signals received by the transmit-receive antennas A1–A4. Vectorization of the phase shift gives the array response vector. Phase shift is expressed as optical path difference divided by wavelength.

It must be noted, however, that Equation 2 expresses the receive vectors at the location of the monitor antenna 41, not at the mobile station. When the monitor antenna 41 is positioned very close to the adaptive array antenna, therefore, the phase difference owing to the phase shift terms ξ1–ξ4 becomes large and a discrepancy (error) arises between the receive level at the monitor antenna 41 and the level predicted as that which should be received by the mobile station.

As this leads to the conclusion that the phase shift terms ξ1–ξ4 should preferably be substantially eliminated, in this embodiment the array response vector h'(θ) expressed by Equation 4 obtained by amending Equation 3 is used instead.

$$h'(\theta)=\begin{pmatrix}\xi1^* & \Psi1\\ \xi2^* & \Psi2\\ \xi3^* & \Psi3\\ \xi4^* & \Psi4\end{pmatrix}=\begin{pmatrix}\xi1^* & 1\\ \xi2^* & e^{(j\cdot 2\pi\cdot d\cdot\sin\theta)/\lambda}\\ \xi3^* & e^{(j\cdot 2\pi\cdot 2d\cdot\sin\theta)/\lambda}\\ \xi4^{4*} & e^{(j\cdot 2\pi\cdot 3d\cdot\sin\theta)/\lambda}\end{pmatrix} \quad \text{(Eq. 4)}$$

ξ1*–ξ4* are the conjugate complex numbers of ξ1–ξ4.

When the array response vector h'(θ) represented by Equation 4 is used, the phase terms dependent on the location of the monitor antenna 41 are substantially eliminated and a directivity pattern can be obtained for the case where the monitor antenna 41, like the target mobile station, is present at an infinite distance.

In this embodiment, when the phase term θ is varied with respect to the array response vector h'(θ) represented by Equation 4, the monitor system of the monitor antenna 41 can acquire the receive level at the direction angle corresponding to every phase θ. As a result, it becomes possible to obtain the level characteristics of a directivity pattern over 360 degrees such as shown in FIG. 3.

Thus, in the CDMA base station of this embodiment, test signals are mixed with the communications signals supplied to N number of transmit-receive antennas, the phase of the test signals is rotated by 360 degrees of the directivity pattern, and the monitor system receives the test signals wirelessly transmitted from the multiple transmit-receive antennas and monitors the directivity pattern over 360 degrees.

With the CDMA base station of this embodiment, therefore, even if the monitor antenna 1 is fixed in place, the characteristics of the entire directivity pattern can still be monitored because the monitor system is able to acquire the receive level at every angle within the 360-degree range of the directivity pattern. As a result, AAA performance can be monitored with higher accuracy than in the case where the receive level at only a single direction angle is monitored.

In this embodiment, the testing signal of the present invention is constituted by the test signal and the testing signal wireless transmission means is constituted by the function of the AAA signal processor D1 which generates multiple test signals differing in phase and wirelessly transmits them from the transmit-receive antenna system.

The transmission power of the test signals will now be explained.

In this embodiment, the transmission power of the test signals is preferably set very low.

Although it suffices for the test signals wirelessly transmitted from the multiple transmit-receive antennas A1–A4 to reach the monitor antenna 41, they are inevitably radiated toward the entire area covered by the CDMA base station. They therefore become interference signals from the viewpoint of mobile stations other than the target mobile station present in the area. The transmission power of the test signals must therefore be kept as low as practically possible. Moreover, the purpose of transmitting the test signals is to ascertain whether or not the transmit antenna weights generated with respect to the user are correctly generated and to achieve this purpose it is only required for the monitor antenna 41 to be able to receive the test signals.

The transmission power of the test signals can be set by calculation from (1) the amount of signal attenuation over the spatial distance between the multiple transmit-receive antennas A1–A4 and the monitor antenna 41 and (2) the ratio of signal power to interference power (S/N: Signal to Noise power ratio) required by the monitor system. Then, by setting the transmission power of the test signals as low as possible, a condition can be established in which the receive level of the test signals at a mobile station in the area covered by the CDMA base station at the time the test signals reach the mobile station is so extremely low as to be masked by noise and unnoticeable. The problem of interference by the test signals can therefore be eliminated.

Different ways are available for reducing the transmission power of the test signals. For example, when the signals output from the test channel generator T to the adders K1–K4 associated with the individual transmit-receive antennas A1–A4 are implemented in the digital domain, the transmission power of the test signals can be reduced by setting the number of signal bits low. When the signals are implemented in the analog domain, the transmission power of the signals can be attenuated by an attenuator or the like.

As explained in the foregoing, in the CDMA base station of this embodiment, the transmission power of the test signals is set at a value that enables the test signals to reach the M number of monitor antenna from the multiple transmit-receive antennas and that is low in comparison with the transmission power of the all-important communications signals, whose purpose is not for monitoring. By this, the transmission power of the test signals can be set extremely low.

The CDMA base station of this embodiment can therefore avoid increase in the amount of interference owing to the presence of the test signals, while also effectively monitoring AAA performance.

This embodiment was explained with regard to the case where the CDMA base station wirelessly transmits the test signals to the mobile stations at the same time as wirelessly transmitting the communications signals. It is, however, also possible to wirelessly transmit the test signals at a time when communications signals are not being wirelessly transmitted.

As explained in the foregoing, in this embodiment, the monitor antenna 41 is disposed at a location near the multiple transmit-receive antennas A1–A4 and the transmission power of the test signals is set to be small in comparison with the transmission power of the communications signal wirelessly transmitted to the mobile stations but to be receivable by the monitor antenna 41.

In the foregoing, embodiments were described in which the CDMA base station is equipped with a transmit-receive antenna system and a monitor system. In a CDMA base station equipped with a calibration system for conducting calibration at the time of transmission, however, the monitor system and the calibration system can be constituted as the same system. Since a configuration that provides a monitor system separately from the calibration system enlarges equipment size, it is preferable when actually applying the present invention to a base station to enable the calibration system and the monitor system to be configured as a single system.

Specifically, a base station equipped with an adaptive array antenna generally requires calibration and therefore may be equipped with an antenna for use in calibration. In such a case, the calibration system and monitor system can be established in common to reduce the cost and circuit scale of the base station as a whole.

The calibration and monitor systems differ in operation in the point that, in the calibration system operation phase error and amplitude error information measured with respect to the transmit-receive antenna system is fed back to the BTS to correct the antenna weights at the time of transmission, while in the monitor system operation level information regarding the directivity pattern and the like are monitored. The increase in the size of the circuitry when a monitor system is configured using an existing calibration system is therefore nil or very small.

In the CDMA base station of this embodiment, a monitor system was established using the same system as for conducting calibration, as explained in the foregoing.

In the CDMA base station of this embodiment, therefore, the cost required for implementing monitor system capability can be markedly reduced by building all of the monitor system functions into the calibration system.

The calibration system is capable of calibrating for characteristic error of the wireless communications system that wirelessly transmits and receives signals using multiple transmit-receive antennas, and in this embodiment the wireless communications system is constituted by the transmit-receive antenna system.

In addition, part of the processing section of the monitor system can be constituted in common with the processing section of the calibration system.

The embodiments described in the foregoing represent cases in which the present invention is applied to a base station for wireless telecommunications using CDMA technology. However, the present invention can also be preferably applied to a base station for conducting wireless telecommunications with mobile stations that utilize W(Wideband)-CDMA technology.

The world standard for W-CDMA, a next-generation mobile telecommunications technology, includes use of the adaptive array antenna as a specification option, making adaptive array antenna utilization possible at the discretion of the operator. Application of the present invention to the W-CDMA base station thus makes it possible to ascertain the normality of the AAA operating condition as explained in the foregoing. As a result, it becomes possible to structure a cellular telephone network that can reduce base station unit cost and management expense and thus lower infrastructure equipment expense.

Thus when the base station of this embodiment is applied to the W-CDMA system as a preferable mode of utilization, it enables a reduction in infrastructure equipment costs and, in turn, a reduction in the infrastructure costs shared by the systems users (e.g., users of mobile phones and other such mobile stations). The cost burden of many users can therefore be lightened.

Moreover, the configuration of the telecommunications device and the telecommunications device achieved directivity accuracy monitor of the present invention and the mode of implementing the method of monitoring achieved directivity accuracy in a telecommunications device of the present invention are not limited to those set out in the foregoing and it is alternatively possible to adopt any of various other configurations and modes.

Moreover, the present invention is not limited to the field of application described in the foregoing but can also be applied in various other fields. While the foregoing embodiments represent cases of applying the present invention to the CDMA base station, the the present invention can also be applied not only to various other systems such as mobile phone systems and the PHS (Personal Hand phone System).

The various types of processing carried out in the telecommunications device, telecommunications device achieved directivity accuracy monitor and method of monitoring achieved directivity accuracy in a telecommunications device of the present invention can, for example, be conducted by physical means equipped with a processor, memory and the like wherein the processor controls the processing by executing a control program stored in a ROM (Read Only Memory). Otherwise it can be conducted by independent physical circuits constituting functional means for executing the different processing operations.

Moreover, the present invention can be construed as being constituted of the aforesaid control program or of a floppy disk, CD-ROM or other computer-readable recording medium storing the control program, and the processing according to the present invention can be carried out by loading the control program from the recording medium into a computer and executing it by use of the processor.

As explained in the foregoing, the present invention provides a telecommunications device wherein wireless signal communication is conducted using multiple communications antennas while controlling the overall directivity of the multiple antennas. At least one monitor antenna, installed separately from multiple communications antennas controlled to achieve a prescribed overall directivity, wirelessly receives signals from the multiple communications antennas. The signals received by the monitor antenna are used to acquire information regarding the overall directivity of the multiple communications antennas, and the accuracy of achieved overall directivity of the multiple communications antennas is monitored based on a difference between the acquired directivity information and directivity information predicted to be acquired when a prescribed directivity is achieved. This configuration ensures high reliability of adaptive array antenna transmit directivity, lowers operating cost, and enables monitoring by a person without expert knowledge.

What is claimed is:

1. A telecommunications device wherein wireless signal communication is conducted using multiple communications antennas while controlling an overall directivity of the multiple communications antennas, the telecommunications device comprising:

at least one monitor antenna, installed separately from the multiple communications antennas controlled to achieve a prescribed overall directivity, for wirelessly receiving signals from the multiple communications antennas;

directivity information acquisition means for acquiring, based on the signals received by the monitor antenna, information regarding the overall directivity of the multiple communications antennas; and directivity information output means for outputting the directivity information acquired by the directivity information acquisition means to an external achieved directivity accuracy monitoring means adapted to monitor the accuracy of achieved overall directivity of the multiple communications antennas based on a difference between the directivity information and directivity information predicted to be acquired by the directivity information acquisition means when the prescribed directivity is achieved.

2. A telecommunications device according to claim 1, wherein a baseband signal processor is equipped with the achieved directivity accuracy monitoring means and the directivity information output means, wherein the baseband signal processor is capable of baseband processing of signals wirelessly transmitted and received using the multiple communications antennas and is capable of communicating with an external monitoring unit for monitoring the telecommunications device, wherein the directivity information acquisition means outputs acquired directivity information to the baseband signal processor, and wherein the directivity information output means outputs directivity information from the baseband signal processor to the external monitoring unit.

3. A telecommunications device wherein wireless signal communication is conducted using multiple communications antennas while controlling an overall directivity of the multiple communications antennas, the telecommunications device comprising:

at least one monitor antenna, installed separately from the multiple communications antennas controlled to achieve a prescribed overall directivity, for wirelessly receiving signals from the multiple communications antennas;

directivity information acquisition means for acquiring, based on the signals received by the monitor antenna, information regarding the overall directivity of the multiple communications antennas; and achieved directivity accuracy monitoring means for monitoring the accuracy of achieved overall directivity of the multiple communications antennas based on a difference between the directivity information acquired by the directivity information acquisition means and directivity information predicted to be acquired by the directivity information acquisition means when the prescribed directivity is achieved.

4. A telecommunications device according to claim 1, wherein multiple monitor antennas are installed, each of the multiple monitor antennas being installed at a different location, wherein the directivity information acquisition means acquires information regarding overall directivity of the multiple communications antennas for each monitor antenna based on the signals received by the monitor antennas, and wherein the achieved directivity accuracy monitoring means monitors the overall directivity of the multiple communications antennas based on a difference between the directivity information for each monitor antenna acquired by the directivity information acquisition means and directivity information for each monitor antenna predicted to be acquired by the directivity information acquisition means when the prescribed directivity is achieved.

5. A telecommunications device according to claim 2, wherein multiple monitor antennas are installed, each of the multiple monitor antennas being installed at a different location, wherein the directivity information acquisition means acquires information regarding overall directivity of the multiple communications antennas for each monitor antenna based on the signals received by the monitor antennas, and wherein the achieved directivity accuracy monitoring means monitors the overall directivity of the multiple communications antennas based on a difference between the directivity information for each monitor antenna acquired by the directivity information acquisition means and directivity information for each monitor antenna predicted to be acquired by the directivity information acquisition means when the prescribed directivity is achieved.

6. A telecommunications device according to claim 3, wherein multiple monitor antennas are installed, each of the multiple monitor antennas being installed at a different location, wherein the directivity information acquisition means acquires information regarding overall directivity of the multiple communications antennas for each monitor antenna based on the signals received by the monitor antennas, and wherein the achieved directivity accuracy monitoring means monitors the overall directivity of the multiple communications antennas based on a difference between the directivity information for each monitor antenna acquired by the directivity information acquisition means and directivity information for each monitor antenna predicted to be acquired by the directivity information acquisition means when the prescribed directivity is achieved.

7. A telecommunications device according to claim 1, further comprising:

received signal attenuation means for attenuating signals received by the at least one monitor antenna and outputting the received signals to the directivity information acquisition means, wherein the monitor antenna receives communications signals wirelessly transmitted from the multiple communications antennas and the directivity information acquisition means acquires information regarding the overall directivity of the multiple communications antennas based on the communications signals attenuated by the received signal attenuation means.

8. A telecommunications device according to claim 3, further comprising:

received signal attenuation means for attenuating signals received by the at least one monitor antenna and outputting the received signals to the directivity information acquisition means, wherein the monitor antenna receives communications signals wirelessly transmitted from the multiple communications antennas and the directivity information acquisition means acquires information regarding the overall directivity of the multiple communications antennas based on the communications signals attenuated by the received signal attenuation means.

9. A telecommunications device according to claim 1, further comprising:

testing signal wireless transmission means that wirelessly transmits from the multiple communications antennas a plurality of different testing signals that make the effect of the overall directivity of the multiple communications antennas on the at least one monitor antenna like that of rotating a direction angle of the prescribed directivity a total of 360 degrees, wherein the monitor antenna receives the testing signals wirelessly transmitted from the multiple communications antennas by the testing signal wireless transmission means, and the directivity information acquisition means acquires information regarding the overall directivity of the multiple communications antennas based on the testing signals received by the monitor antenna.

10. A telecommunications device according to claim 2, further comprising:

testing signal wireless transmission means that wirelessly transmits from the multiple communications antennas a plurality of different testing signals that make the effect of the overall directivity of the multiple communications antennas on the at least one monitor antenna like that of rotating a direction angle of the prescribed directivity a total of 360 degrees, wherein the monitor antenna receives the testing signals wirelessly transmitted from the multiple communications antennas by the testing signal wireless transmission means, and the directivity information acquisition means acquires information regarding the overall directivity of the multiple communications antennas based on the testing signals received by the monitor antenna.

11. A telecommunications device according to claim 3, further comprising:

testing signal wireless transmission means that wirelessly transmits from the multiple communications antennas a plurality of different testing signals that make the effect of the overall directivity of the multiple communications antennas on the at least one monitor antenna like that of rotating a direction angle of the prescribed directivity a total of 360 degrees, wherein the monitor antenna receives the testing signals wirelessly transmitted from the multiple communications antennas by the testing signal wireless transmission means, and the directivity information acquisition means acquires information regarding the overall directivity of the multiple communications antennas based on the testing signals received by the monitor antenna.

12. A telecommunications device according to claim 4, further comprising:

testing signal wireless transmission means that wirelessly transmits from the multiple communications antennas a plurality of different testing signals that make the effect of the overall directivity of the multiple communications antennas on the at least one monitor antenna like that of rotating a direction angle of the prescribed directivity a total of 360 degrees, wherein the monitor antenna receives the testing signals wirelessly transmitted from the multiple communications antennas by the testing signal wireless transmission means, and the directivity information acquisition means acquires information regarding the overall directivity of the multiple communications antennas based on the testing signals received by the monitor antenna.

13. A telecommunications device according to claim 5, further comprising:

testing signal wireless transmission means that wirelessly transmits from the multiple communications antennas a plurality of different testing signals that make the effect of the overall directivity of the multiple communications antennas on the at least one monitor antenna like that of rotating a direction angle of the prescribed directivity a total of 360 degrees, wherein the monitor antenna receives the testing signals wirelessly transmitted from the multiple communications antennas by the testing signal wireless transmission means, and the directivity information acquisition means acquires information regarding the overall directivity of the multiple communications antennas based on the testing signals received by the monitor antenna.

14. A telecommunications device according to claim 6, further comprising:

testing signal wireless transmission means that wirelessly transmits from the multiple communications antennas a plurality of different testing signals that make the effect of the overall directivity of the multiple communications antennas on the at least one monitor antenna like that of rotating a direction angle of the prescribed directivity a total of 360 degrees, wherein the monitor antenna receives the testing signals wirelessly transmitted from the multiple communications antennas by the testing signal wireless transmission means, and the directivity information acquisition means acquires information regarding the overall directivity of the multiple communications antennas based on the testing signals received by the monitor antenna.

15. A telecommunications device according to claim 9, wherein the at least one monitor antenna is installed at a location near the multiple communications antennas, wherein the testing signal wireless transmission means wirelessly transmits testing signals at a transmission power that is smaller than a transmission power of the communications signals wirelessly transmitted from the multiple communications antennas, and wherein the transmission power of the testing signals is receivable by the monitor antenna.

16. A telecommunications device according to claim 11, wherein the at least one monitor antenna is installed at a location near the multiple communications antennas, wherein the testing signal wireless transmission means wirelessly transmits testing signals at a transmission power that is smaller than a transmission power of the communications signals wirelessly transmitted from the multiple communications antennas, and wherein the transmission power of the testing signals is receivable by the monitor antenna.

17. A telecommunications device according to claim 1, further comprising:

a calibration system for calibrating for error in characteristics of a wireless communications system for wirelessly transmitting/receiving signals using the multiple communications antennas, wherein a processing section of the calibration system and a processing section of a monitor system that uses the monitor antenna to monitor the accuracy of the achieved directivity are partially or wholly formed in common.

18. A telecommunications device according to claim 3, further comprising:

a calibration system for calibrating for error in characteristics of a wireless communications system for wirelessly transmitting/receiving signals using the multiple communications antennas, wherein a processing section of the calibration system and a processing section of a monitor system that uses the monitor antenna to monitor the accuracy of the achieved directivity are partially or wholly formed in common.

19. A telecommunications device achieved directivity accuracy monitor for monitoring accuracy of achieved directivity in a telecommunications device that wirelessly transmits/receives signals using multiple communications antennas while controlling an overall directivity of the multiple communications antennas, the telecommunications device achieved directivity accuracy monitor comprising:

at least one monitor antenna for wirelessly receiving signals from the multiple communications antennas installed in a telecommunications device and controlled to achieve a prescribed overall directivity;

directivity information acquisition means for acquiring, based on the signals received by the monitor antenna, information regarding the overall directivity of the multiple communications antennas installed in the telecommunications device; and achieved directivity accuracy monitoring means for monitoring the accuracy of achieved overall directivity of the multiple communications antennas installed in the telecommunications device based on a difference between the directivity information acquired by the directivity information acquisition means and directivity information predicted to be acquired by the directivity information acquisition means when a prescribed directivity is achieved.

20. A method of monitoring achieved directivity accuracy in a telecommunications device that wirelessly transmits/receives signals using multiple communications antennas while controlling an overall directivity of the multiple communications antennas, the method of monitoring achieved directivity accuracy in a telecommunications device comprising:

wirelessly receiving signals from multiple communications antennas installed in a telecommunications device and controlled to achieve a prescribed overall directivity using at least one monitor antenna installed separately from the multiple communications antennas installed in the telecommunications device;

acquiring, based on the signals received by the monitor antenna, information regarding the overall directivity of the multiple communications antennas installed in the telecommunications device; and monitoring the accuracy of achieved overall directivity of the multiple communications antennas installed in the telecommunications device based on a difference between the acquired directivity information and directivity information predicted to be acquired when a prescribed directivity is achieved.

* * * * *